(12) United States Patent
Agalgaonkar et al.

(10) Patent No.: US 12,357,115 B1
(45) Date of Patent: Jul. 15, 2025

(54) ENHANCED STAND FOR PORTABLE ELECTRONIC DEVICE

(71) Applicant: Pioneer Square Brands, Inc., High Point, NC (US)

(72) Inventors: Sudeep Balkrishna Agalgaonkar, Jamestown, NC (US); Riley Edvin Lynch, Greensboro, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 19/097,843

(22) Filed: Apr. 1, 2025

(51) Int. Cl.
  *F16M 11/00* (2006.01)
  *A47F 9/04* (2006.01)
  *G06Q 20/34* (2012.01)

(52) U.S. Cl.
  CPC ............ *A47F 9/04* (2013.01); *G06Q 20/341* (2013.01); *A47F 2009/041* (2013.01)

(58) Field of Classification Search
  CPC .... A47F 9/04; A47F 2009/041; G06Q 20/341
  See application file for complete search history.

(56) References Cited

U.S. PATENT DOCUMENTS

| | | | | |
|---|---|---|---|---|
| 2004/0014349 | A1* | 1/2004 | Oddsen, Jr. | H01R 13/625 439/345 |
| 2013/0106353 | A1* | 5/2013 | Foster | H01M 10/465 320/114 |
| 2018/0055166 | A1* | 3/2018 | Rodriguez | F16M 11/041 |
| 2022/0113762 | A1* | 4/2022 | Campbell | F16M 11/22 |

* cited by examiner

*Primary Examiner* — Amy J. Sterling
(74) *Attorney, Agent, or Firm* — Grandview Law

(57) ABSTRACT

Systems involve a device stand system for a portable electronic device and a payment card reader including a platform structure including a first side, a second side extending perpendicularly with respect to the first side, a third side extending perpendicularly with respect to the second side, a fourth side extending perpendicularly with respect to the first side, a portable electronic device holder assembly couplable with the portable electronic device, and a payment card reader holder assembly couplable with the payment card reader; and a stand assembly coupled with the platform structure. Other aspects are described in the claims, drawings, and text forming a part of the present disclosure.

16 Claims, 34 Drawing Sheets

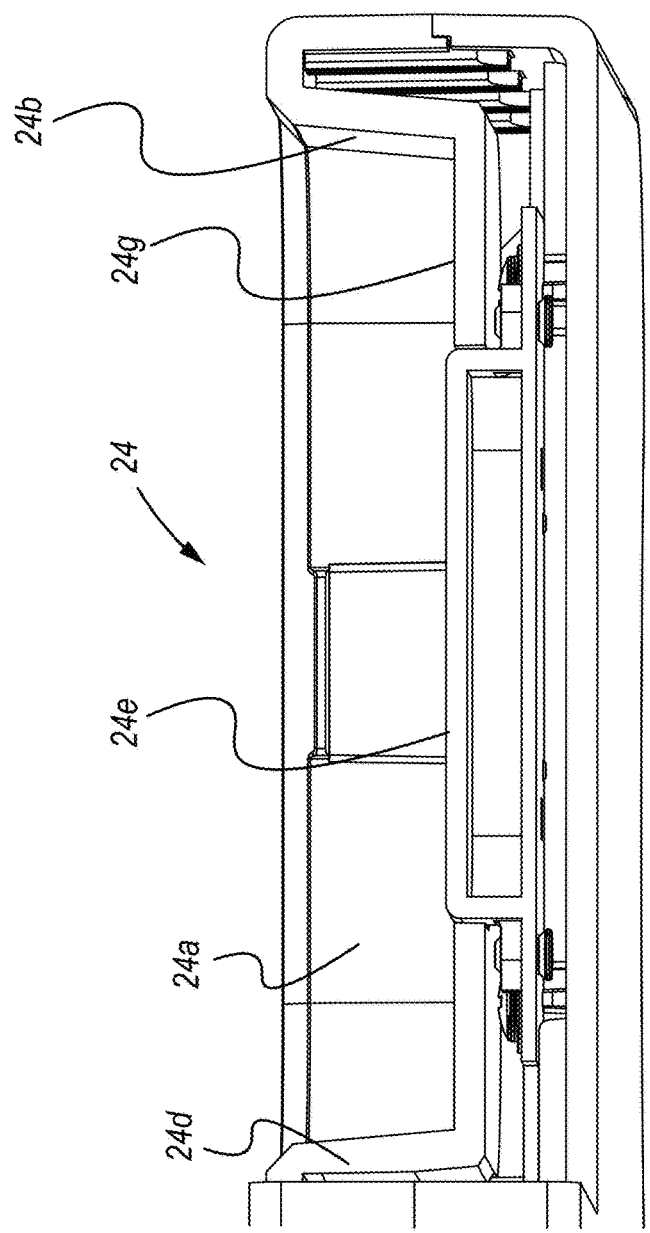

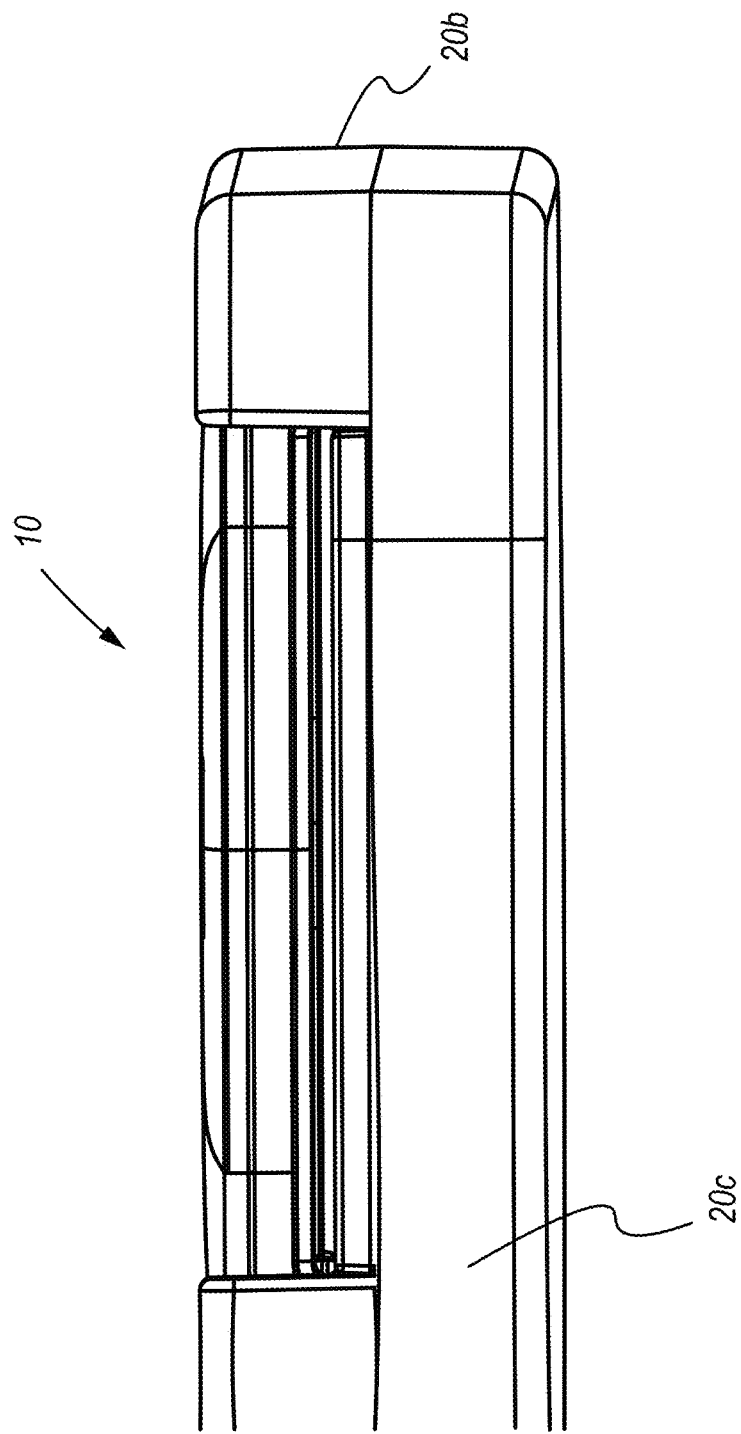

ENHANCED STAND FOR PORTABLE ELECTRONIC DEVICE

In one or more aspects a device stand system for a portable electronic device and a payment card reader includes (I) a platform structure including (A) a first side, (B) a second side extending perpendicularly with respect to the first side, (C) a third side extending perpendicularly with respect to the second side, (D) a fourth side extending perpendicularly with respect to the first side, (E) a portable electronic device holder assembly couplable with the portable electronic device, and (F) a payment card reader holder assembly couplable with the payment card reader; and (II) a stand assembly coupled with the platform structure.

In implementations the portable electronic device holder assembly includes: a base, a first side wall extending perpendicularly with respect to the base, extending parallel with the first side of the platform structure, and positioned closer to the first side of the platform structure than to the third side of the platform structure, a second side wall extending perpendicularly with respect to the base, extending parallel with the second side of the platform structure, and positioned closer to the second side of the platform structure than the fourth side of the platform structure, a third side wall extending perpendicularly with respect to the base, extending parallel with the third side of the platform structure, and positioned closer to the third side of the platform structure than to the first side of the platform structure, and a fourth side wall extending perpendicularly with respect to the base, extending parallel with the fourth side of the platform structure, and positioned closer to the fourth side of the platform structure than to the second side of the platform structure, wherein the second side wall perpendicularly extends with respect to the first side wall, wherein the third side wall parallelly extends with respect to the first side wall, wherein the fourth side wall perpendicularly extends with respect to the first side wall, and wherein the device holder assembly is sized and shaped to couple with the portable electronic device.

In implementations the payment card reader holder assembly includes: a base, a first side wall extending perpendicularly with respect to the base, a second side wall extending perpendicularly with respect to the base, and a third side wall extending perpendicularly with respect to the base, wherein the second side wall perpendicularly extends with respect to the first side wall, wherein the third side wall perpendicularly extends with respect to the first side wall, and wherein the payment card reader holder assembly is sized and shaped to couple with the payment card reader.

In implementations the third side wall of the payment card reader holder assembly extends parallel with the second side wall of the portable electronic device holder, and wherein the third side wall of the payment card reader holder assembly is positioned closer to the second side wall of the portable electronic device holder than the fourth side wall of the portable electronic device holder.

In implementations the payment card holder assembly includes an access opening positioned opposite from the first side wall across the base of the payment card holder assembly.

In implementations the third side of the platform structure includes the access opening.

In implementations the access opening of the payment card holder assembly includes has an electrically activated engagement indicator.

In implementations the payment card holder assembly includes at least one magnet to magnetically couple with a first portion of the payment card reader, and an electrical interface to electrically couple with a second portion of the payment card reader.

In implementations the stand assembly includes a stand lower member having a lower portion and an upper portion extending from the lower portion at a first angle, wherein the stand assembly includes a includes a stand upper front member coupled with the upper portion of the stand lower member and extending from the upper portion of the stand lower member at a second angle, and wherein the sum of the first angle and the second angle is greater than ninety degrees.

In implementations the first angle and the second angle of the stand assembly are oblique angles.

In one or more aspects device stand system for a portable electronic device and a payment card reader includes (I) a platform structure including (A) a first side, (B) a second side extending perpendicularly with respect to the first side, (C) a third side extending perpendicularly with respect to the second side, (D) a fourth side extending perpendicularly with respect to the first side, (E) a portable electronic device holder assembly couplable with the portable electronic device, and (F) a payment card reader holder assembly couplable with the payment card reader.

In implementations the portable electronic device holder assembly includes: a base, a first side wall extending perpendicularly with respect to the base, extending parallel with the first side of the platform structure, and positioned closer to the first side of the platform structure than to the third side of the platform structure, a second side wall extending perpendicularly with respect to the base, extending parallel with the second side of the platform structure, and positioned closer to the second side of the platform structure than the fourth side of the platform structure, a third side wall extending perpendicularly with respect to the base, extending parallel with the third side of the platform structure, and positioned closer to the third side of the platform structure than to the first side of the platform structure, and a fourth side wall extending perpendicularly with respect to the base, extending parallel with the fourth side of the platform structure, and positioned closer to the fourth side of the platform structure than to the second side of the platform structure, wherein the second side wall perpendicularly extends with respect to the first side wall, wherein the third side wall parallelly extends with respect to the first side wall, wherein the fourth side wall perpendicularly extends with respect to the first side wall, and wherein the device holder assembly is sized and shaped to couple with the portable electronic device.

In implementations the payment card reader holder assembly includes: a base, a first side wall extending perpendicularly with respect to the base, a second side wall extending perpendicularly with respect to the base, and a third side wall extending perpendicularly with respect to the base, wherein the second side wall perpendicularly extends with respect to the first side wall, wherein the third side wall perpendicularly extends with respect to the first side wall, and wherein the payment card reader holder assembly is sized and shaped to couple with the payment card reader.

In implementations the third side wall of the payment card reader holder assembly extends parallel with the second side wall of the portable electronic device holder, and wherein the third side wall of the payment card reader holder assembly is positioned closer to the second side wall of the portable electronic device holder than the fourth side wall of the portable electronic device holder.

In implementations the payment card holder assembly includes an access opening positioned opposite from the first side wall across the base of the payment card holder assembly.

In implementations the third side of the platform structure includes the access opening.

In one or more aspects a device stand system for a portable electronic device and a payment card reader includes (I) a platform structure couplable with the portable electronic device, the platform structure including (A) a first side, (B) a second side extending perpendicularly with respect to the first side, (C) a third side extending perpendicularly with respect to the second side, (D) a fourth side extending perpendicularly with respect to the first side, and (E) a payment card reader holder assembly couplable with the payment card reader; and (II) a stand assembly coupled with the platform structure.

In implementations the payment card reader holder assembly includes: a base, a first side wall extending perpendicularly with respect to the base, a second side wall extending perpendicularly with respect to the base, and a third side wall extending perpendicularly with respect to the base, wherein the second side wall perpendicularly extends with respect to the first side wall, wherein the third side wall perpendicularly extends with respect to the first side wall, and wherein the payment card reader holder assembly is sized and shaped to couple with the payment card reader.

In implementations the second side wall of the payment card reader holder assembly extends parallel with the second side of the platform structure, and wherein the second side wall of the payment card reader holder assembly is positioned closer to the second side of the platform structure than the fourth side of the platform structure.

In implementations the payment card holder assembly includes an access opening positioned opposite from the first side wall across the base of the payment card holder assembly, and wherein the third side of the platform structure includes the access opening.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Enhanced Stand for Portable Electronic Device, articles of manufacture, compositions of matter for same that may provide context, for instance, in introducing one or more processes and/or devices described herein.

FIG. 19B is an enlarged bottom plan view of a portion of the platform structure of FIG. 10 showing the cross-sectional portion of FIG. 19A.

FIG. 30 is an enlarged bottom plan view of the platform structure of FIG. 10 coupled with the payment card reader of FIG. 1.

DETAILED DESCRIPTION

Figure 1:
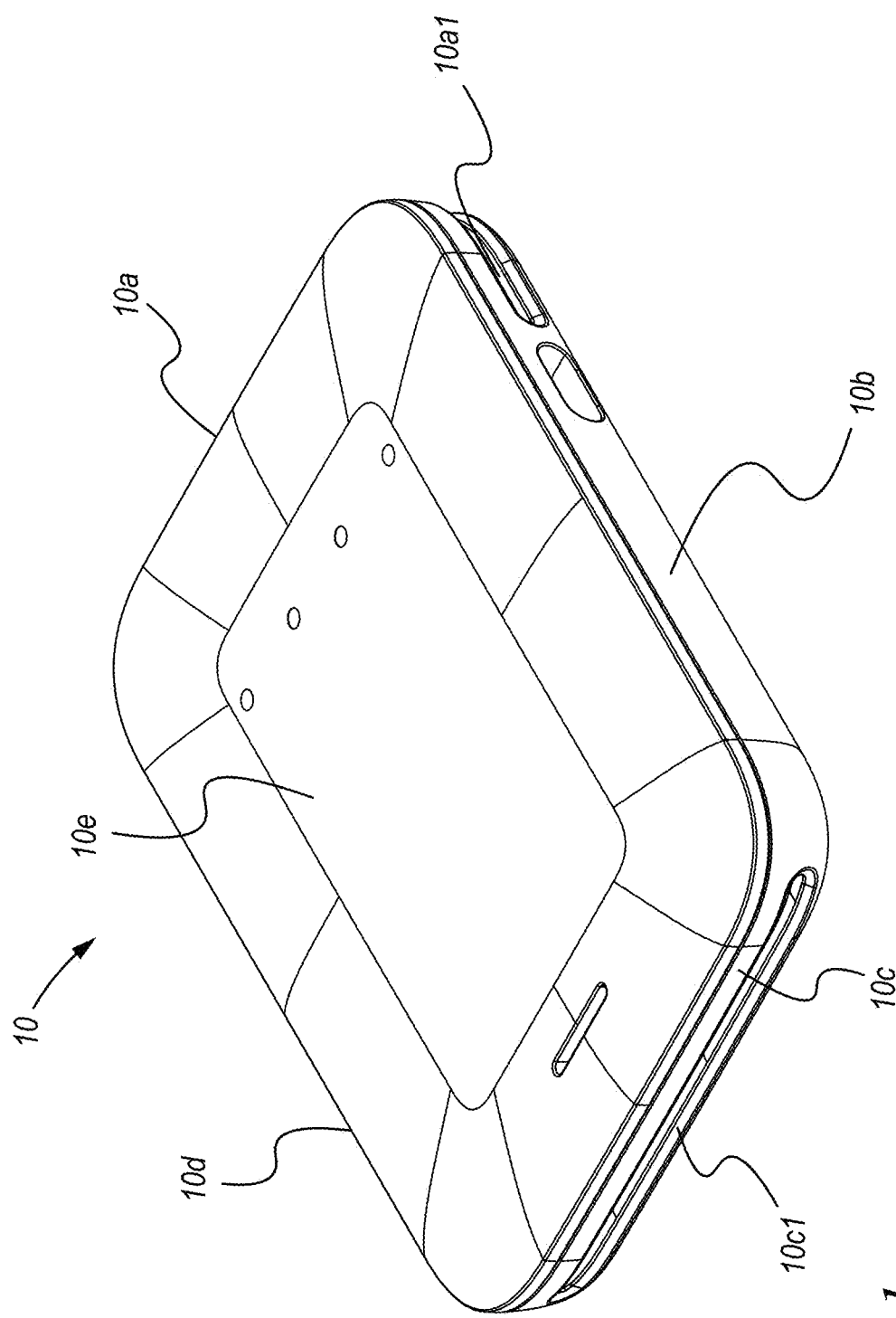
FIG. 1 is a first top perspective view of a payment card reader.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a first top perspective view of payment card reader 10 including side 10a with card slot 10a1, 10b, side with card slot 10c1, side 10d, and top 10e. In implementations payment card reader 10 could also be used to read cards for other purposes such as directed to identification purposes, password entry purposes, coupon entry purposes, etc., in addition to or instead of use with payment cards.

Figure 2:
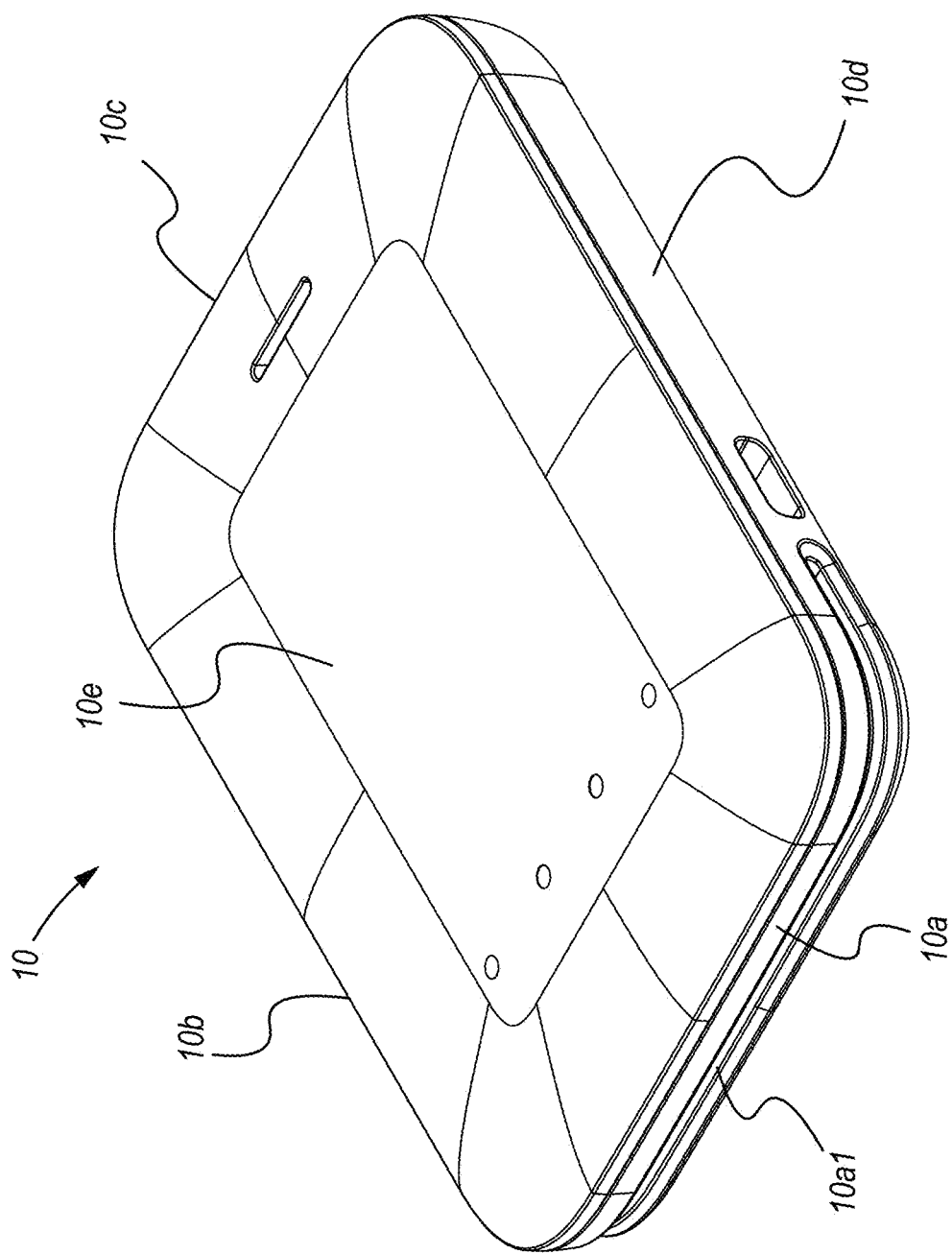
FIG. 2 is a second top perspective view of the payment card reader of FIG. 1.

Turning to FIG. 2, depicted therein is a second top perspective view of payment card reader 10.

Figure 3:
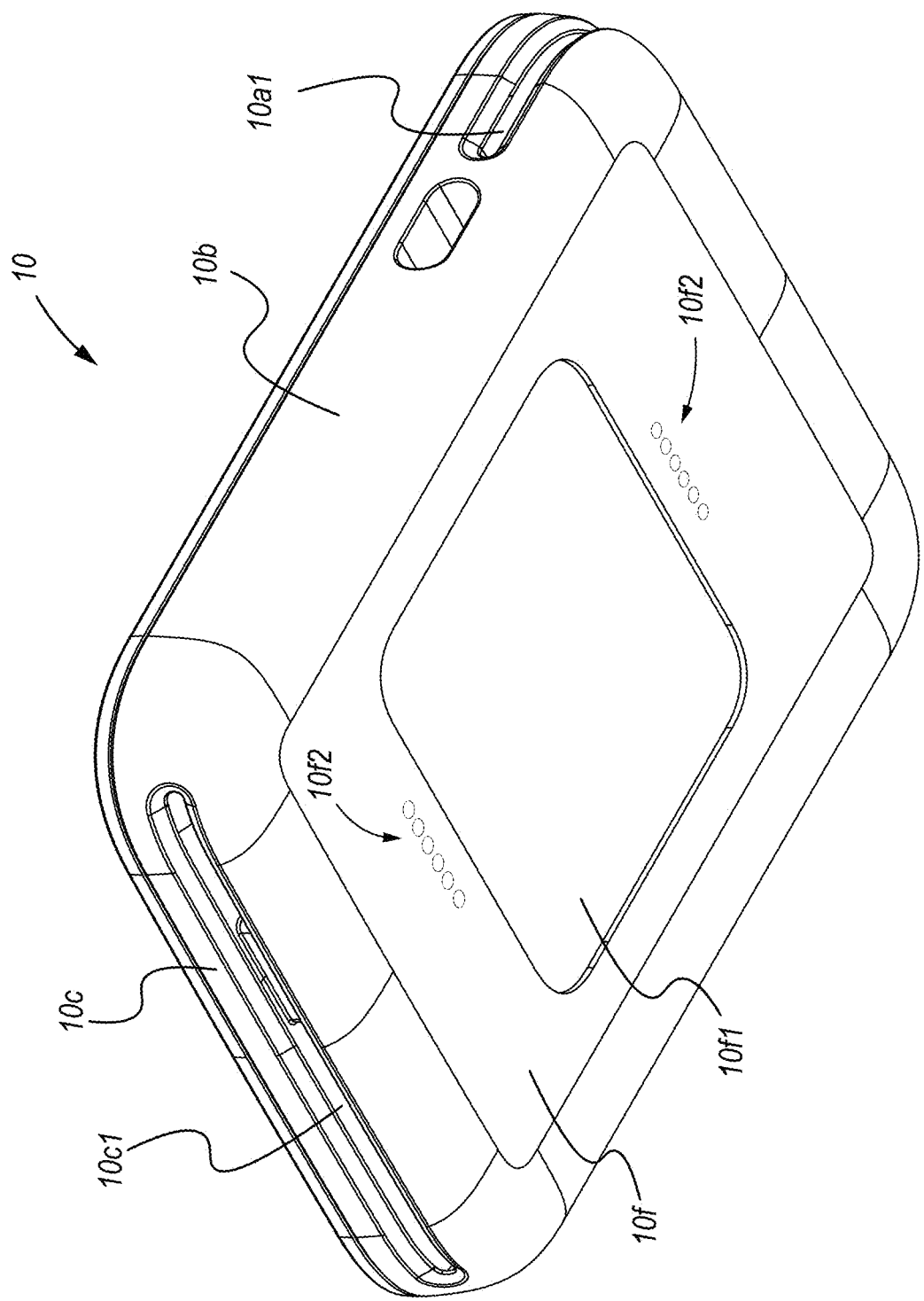
FIG. 3 is a first bottom perspective view of the payment card reader of FIG. 1.

Turning to FIG. 3, depicted therein is a first bottom perspective view of payment card reader 10 including bottom 10f with metal plate 10/1, and electrical interface 10/2.

Figure 4:
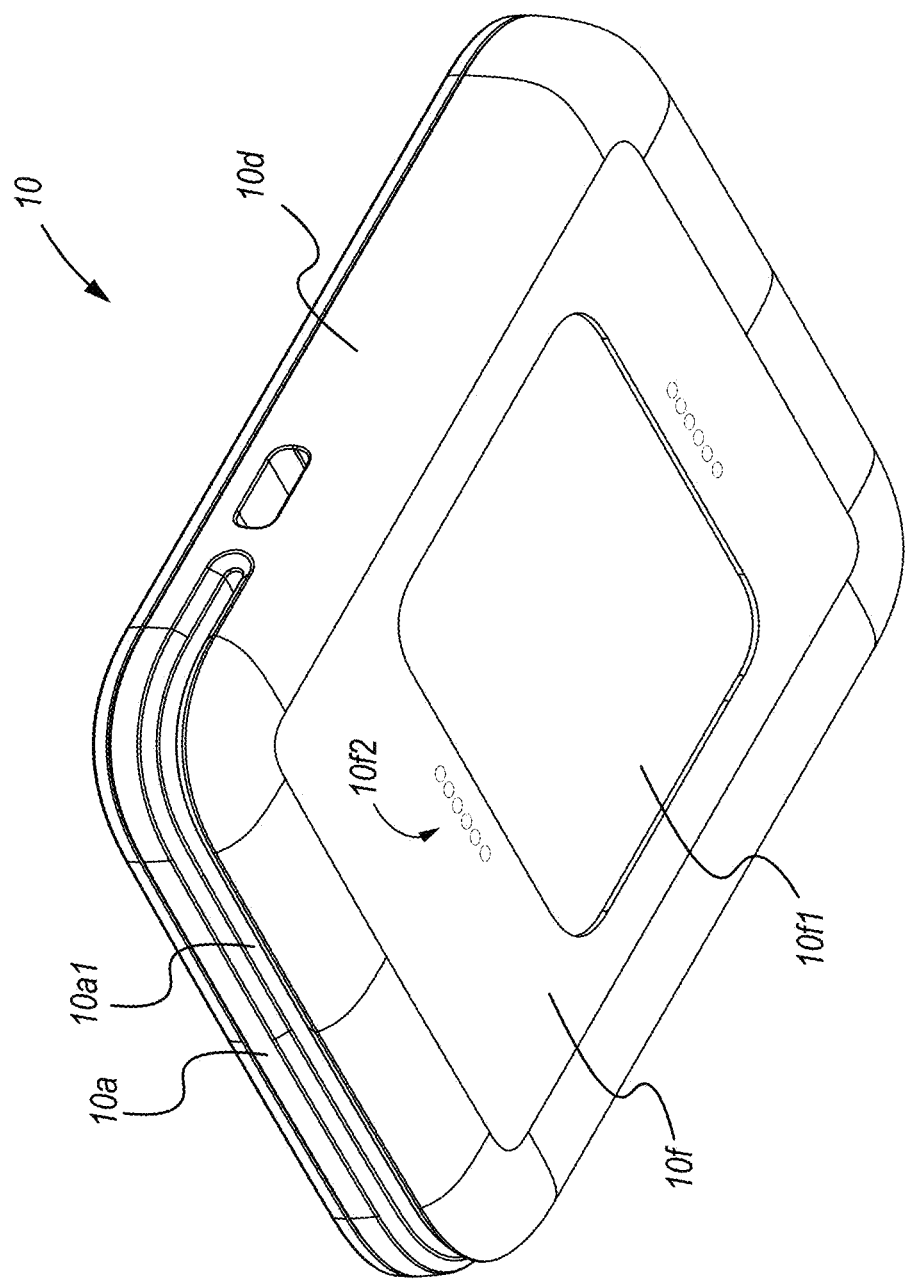
FIG. 4 is a second bottom perspective view of the payment card reader of FIG. 1.

Turning to FIG. 4, depicted therein is a second bottom perspective view of payment card reader 10.

Figure 5:
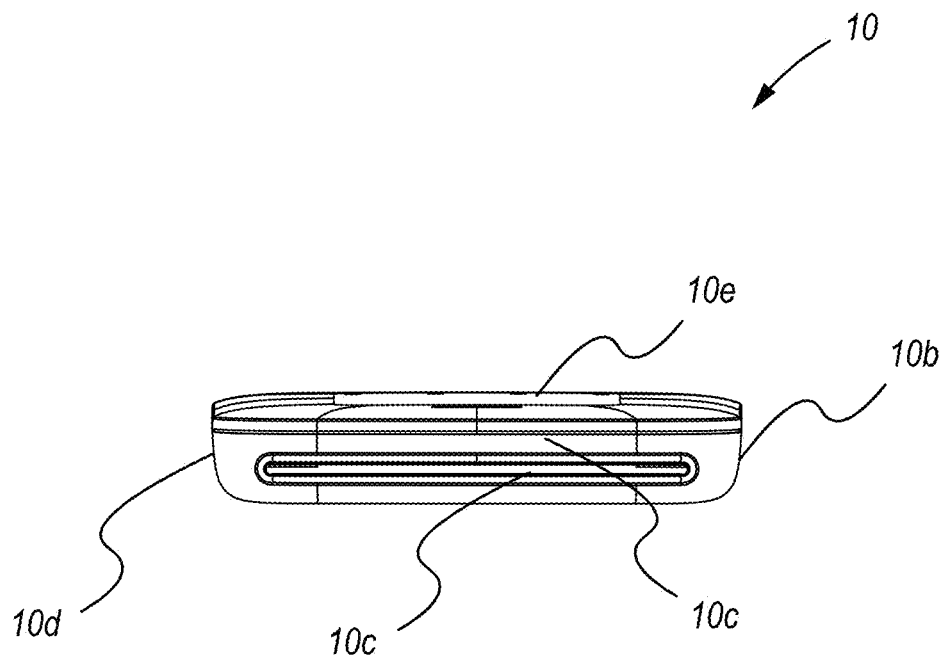
FIG. 5 is a front elevational view of the payment card reader of FIG. 1.

Turning to FIG. 5, depicted therein is a front elevational view of payment card reader 10.

Figure 6:
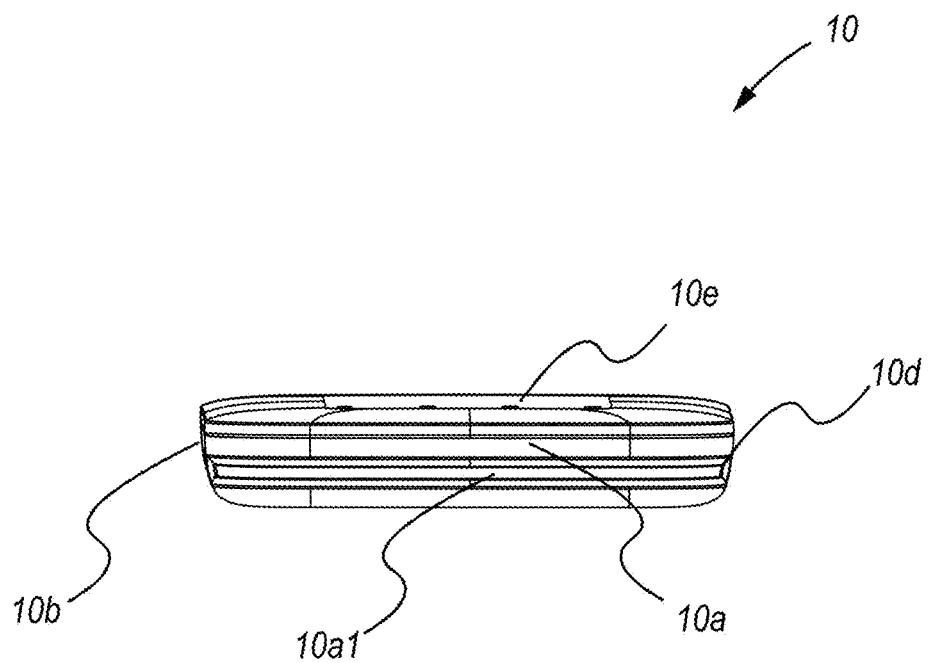
FIG. 6 is a rear elevational view of the payment card reader of FIG. 1.

Turning to FIG. 6, depicted therein is a rear elevational view of payment card reader 10.

Figure 7:
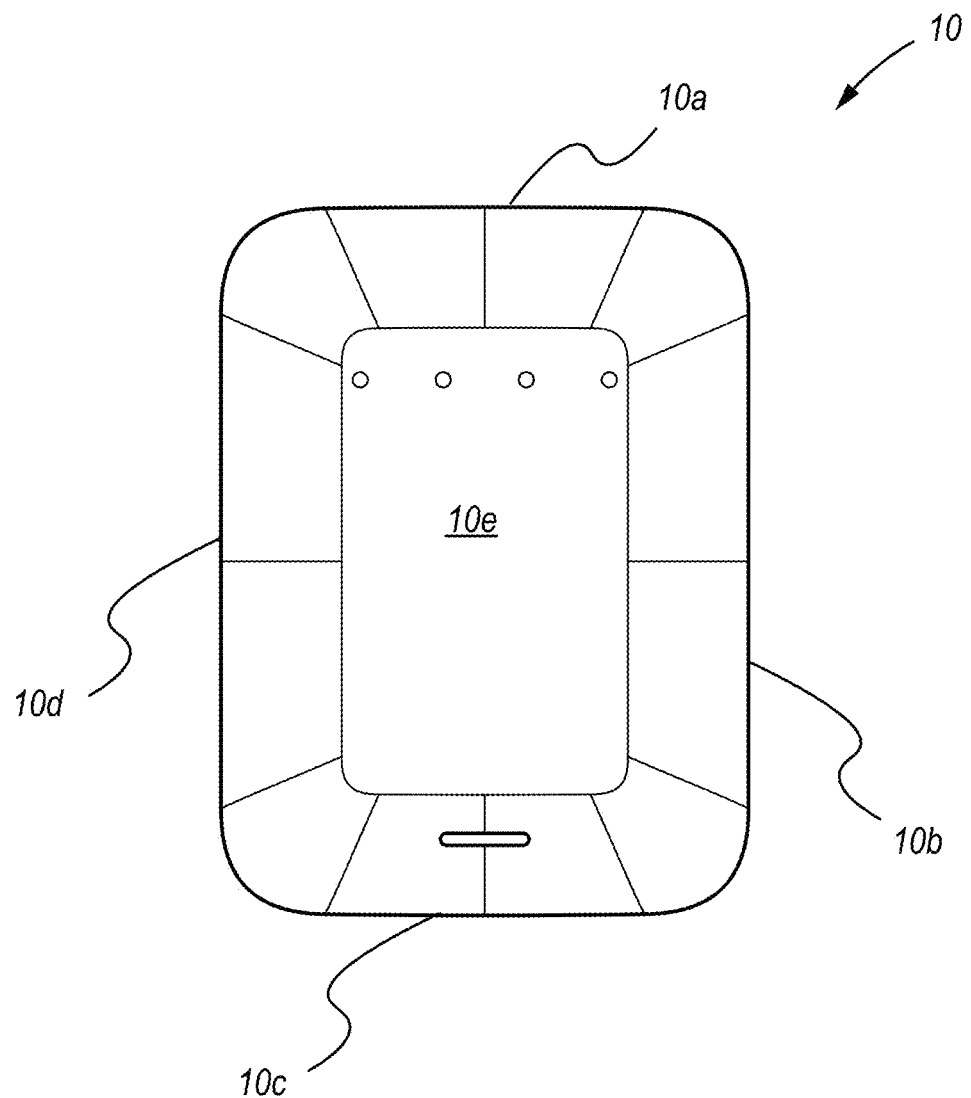
FIG. 7 is a top plan view of the payment card reader of FIG. 1.

Turning to FIG. 7, depicted therein is a top plan view of payment card reader 10.

Figure 8:
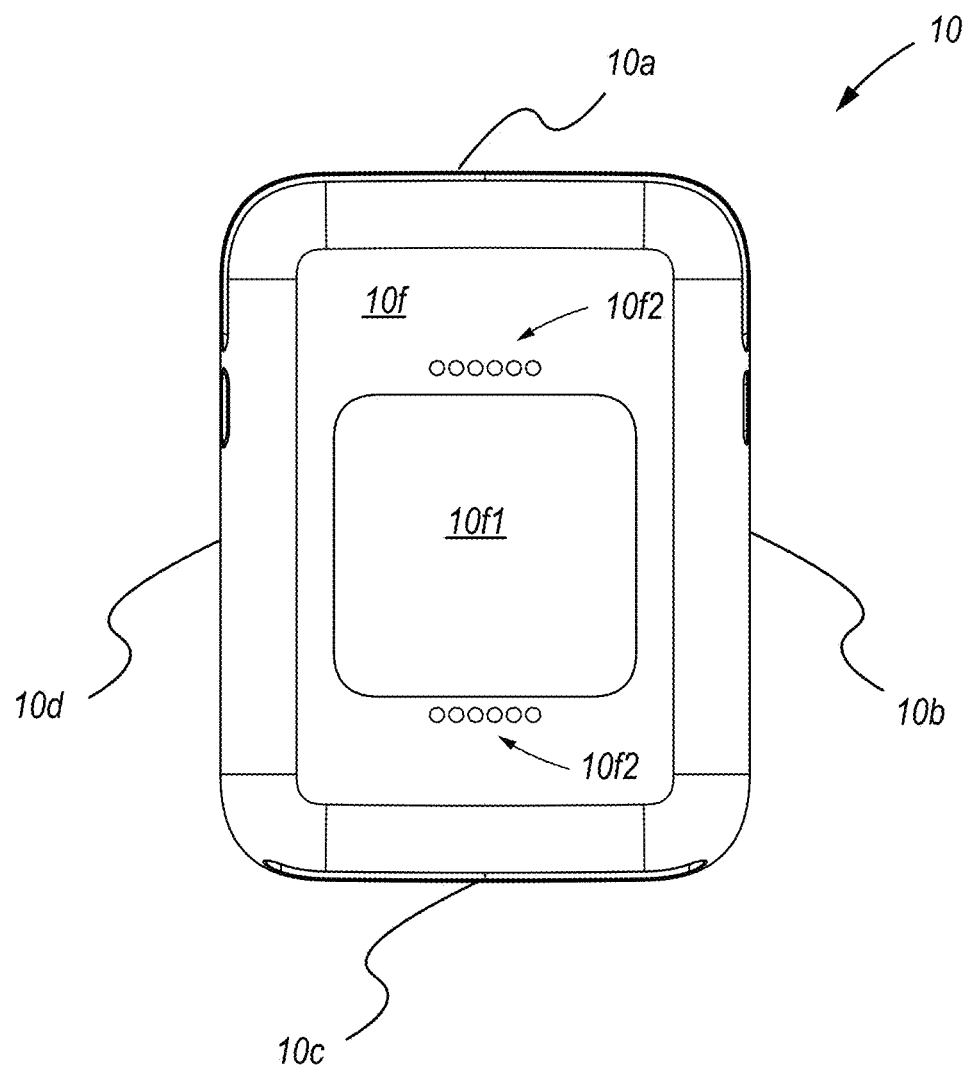
FIG. 8 is a bottom plan view of the payment card reader of FIG. 1.

Turning to FIG. 8, depicted therein is a bottom plan view of payment card reader 10.

Figure 9:
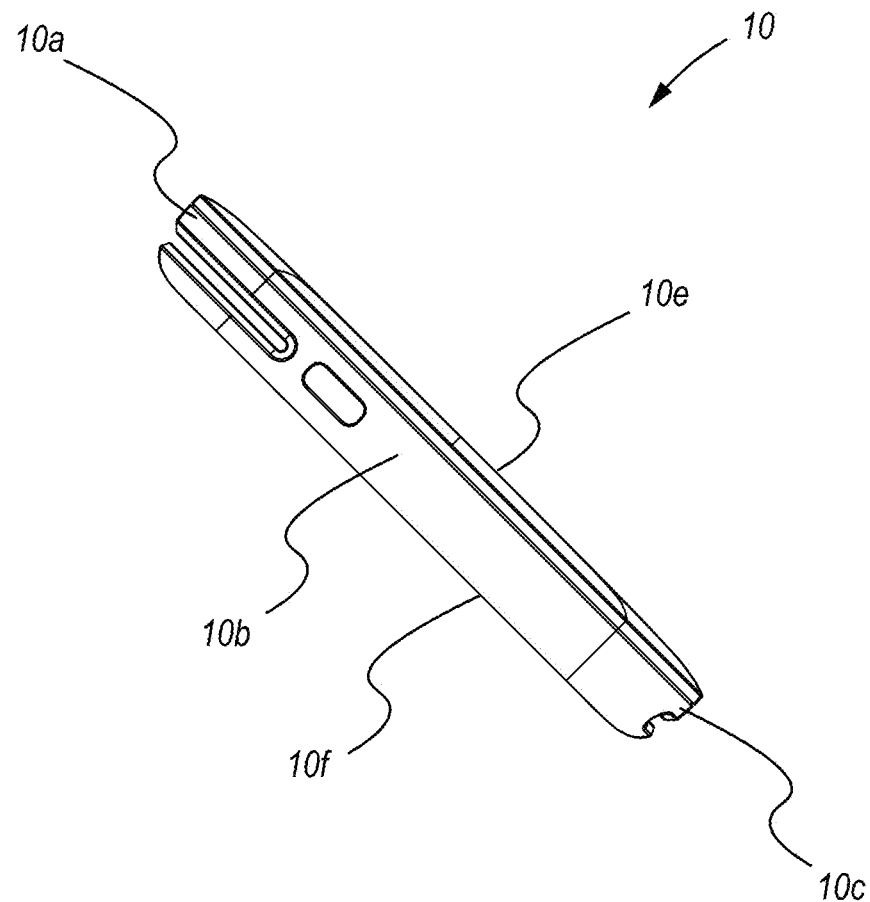
FIG. 9 is a side elevational view of the payment card reader of FIG. 1.

Turning to FIG. 9, depicted therein is a side elevational view of payment card reader 10.

Figure 10:
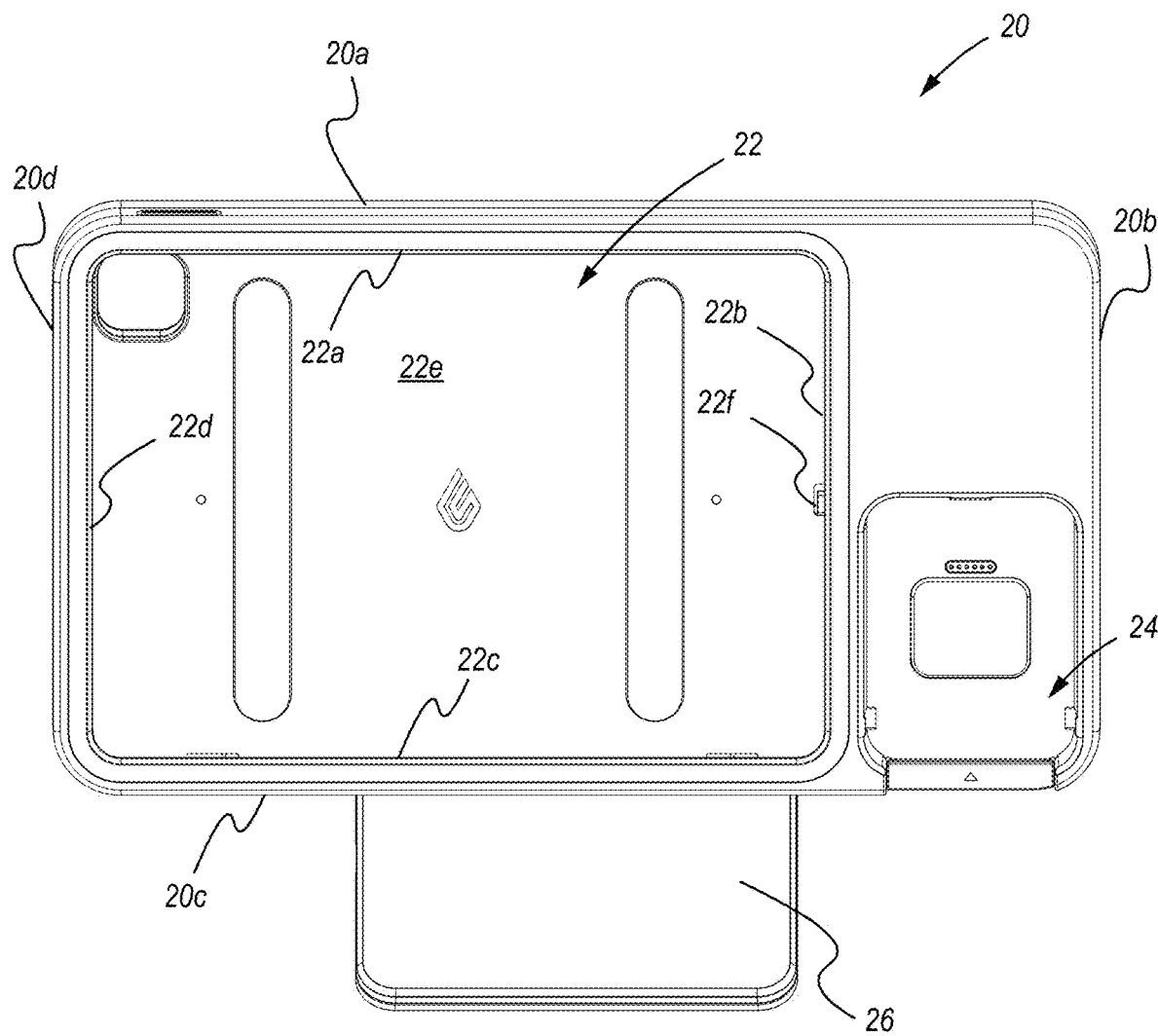
FIG. 10 is a front elevational view of a platform structure coupled with a stand assembly.

Turning to FIG. 10, depicted therein is a front elevational view of platform structure 20 including portable electronic device holder assembly 22 and payment card reader holder assembly 24 with platform structure 20 coupled with stand assembly 26. As depicted platform structure 20 is also shown to include 20a, side, side, and side 20d. In implementations portable electronic device holder assembly 22 includes side wall 22a, side wall 22b, side wall 22c, side wall 22d, base 22e, and electrical connector 22f to electrically coupled with a port portion (not shown) of the electronic tablet 100 shown in FIG. 11.

Figure 11:
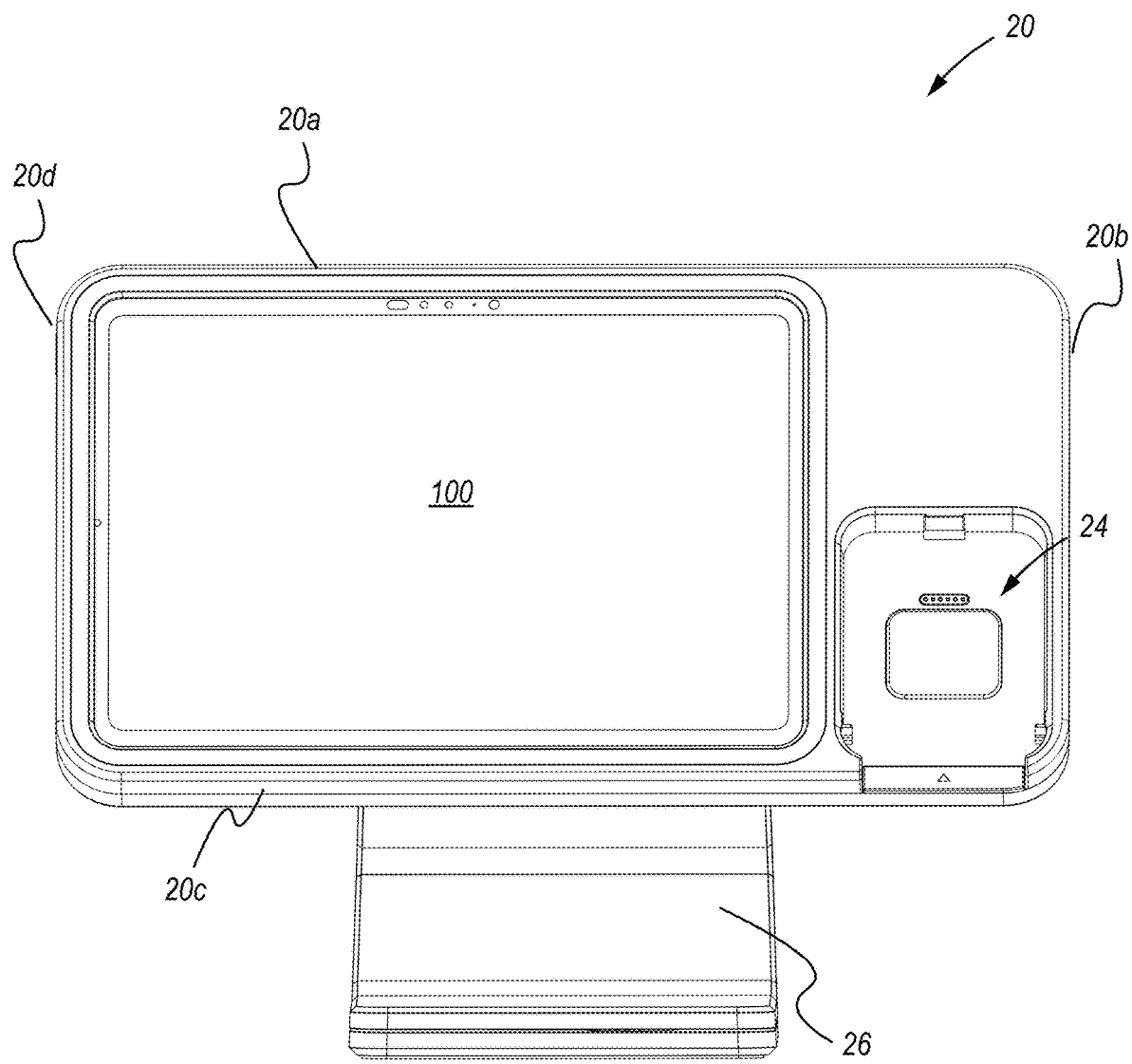
FIG. 11 is a front elevational view of the platform structure coupled with the stand assembly of FIG. 10 coupled with an electronic tablet.

Turning to FIG. 11, depicted therein is a front elevational view of platform structure 20 including portable electronic device holder assembly 22 coupled with electronic tablet 100.

Figure 12:
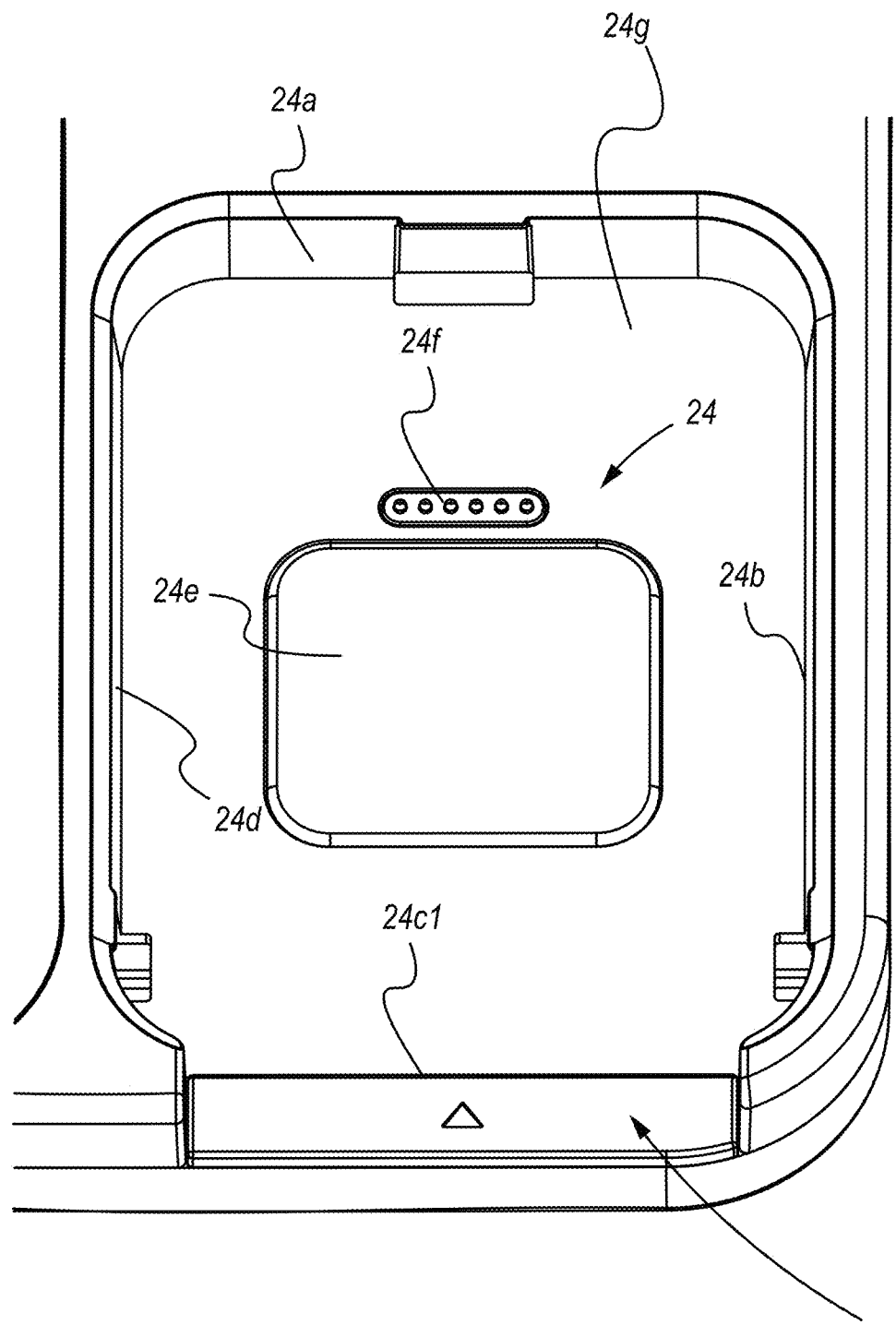
FIG. 12 is an enlarged front elevational view of a portion of the platform structure of FIG. 10.

Turning to FIG. 12, depicted therein is an enlarged front elevational view of platform structure 20 showing payment card reader holder assembly 24 to include side 24a, side 24b, access opening 24c with electrically activated engagement indicator 24c1 (shows users where to insert payment cards into payment card reader 10 when coupled with payment card reader holder assembly 24), side 24d, magnet 24e (for magnetic coupling with metal plate 10/1 of payment card reader 10), electrical interface 24f (for electrical coupling with electrical interface 10/2 of payment card reader 10), and base 24g.

Figure 13:
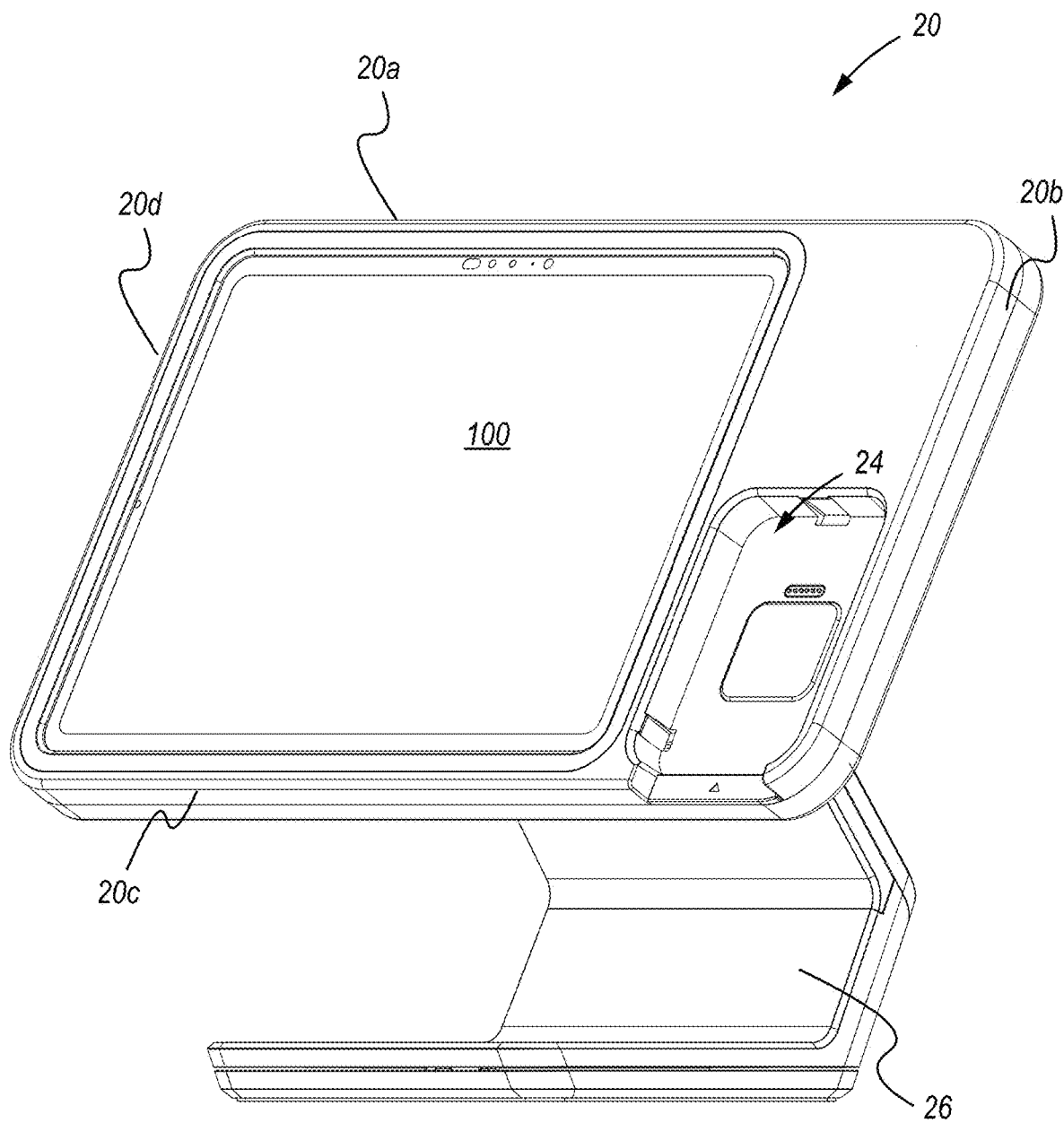
FIG. 13 is a right perspective view of the platform structure coupled with the stand assembly of FIG. 10 coupled with the electronic tablet of FIG. 11.

Turning to FIG. 13, depicted therein is a right perspective view of the platform structure 20 including portable electronic device holder assembly 22 coupled with electronic tablet 100.

Figure 14:
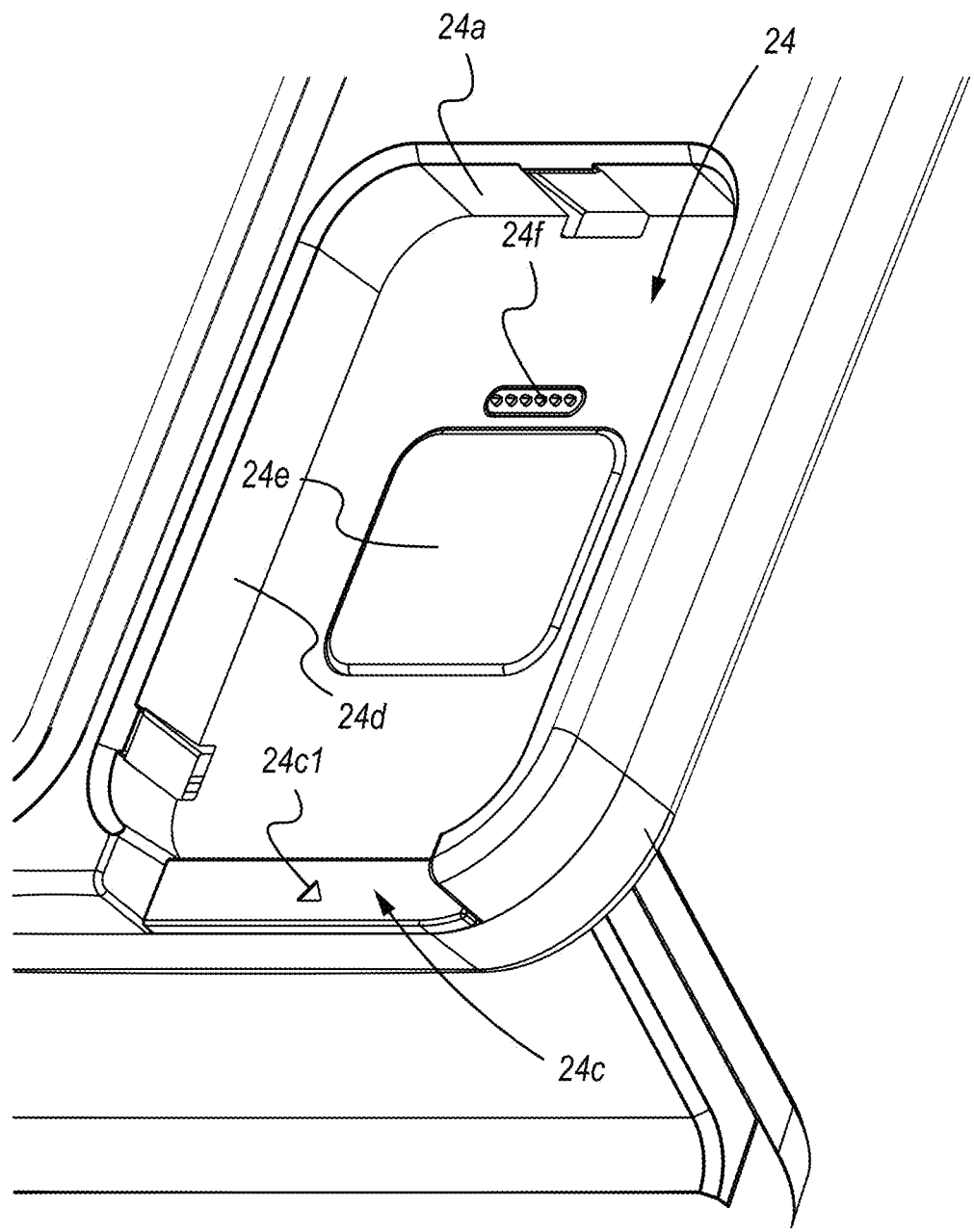
FIG. 14 is an enlarged right perspective view of a portion of the platform structure coupled with the stand assembly of FIG. 10.

Turning to FIG. 14, depicted therein is an enlarged right perspective view of a portion of platform structure 20 including payment card reader holder assembly 24.

Figure 15:
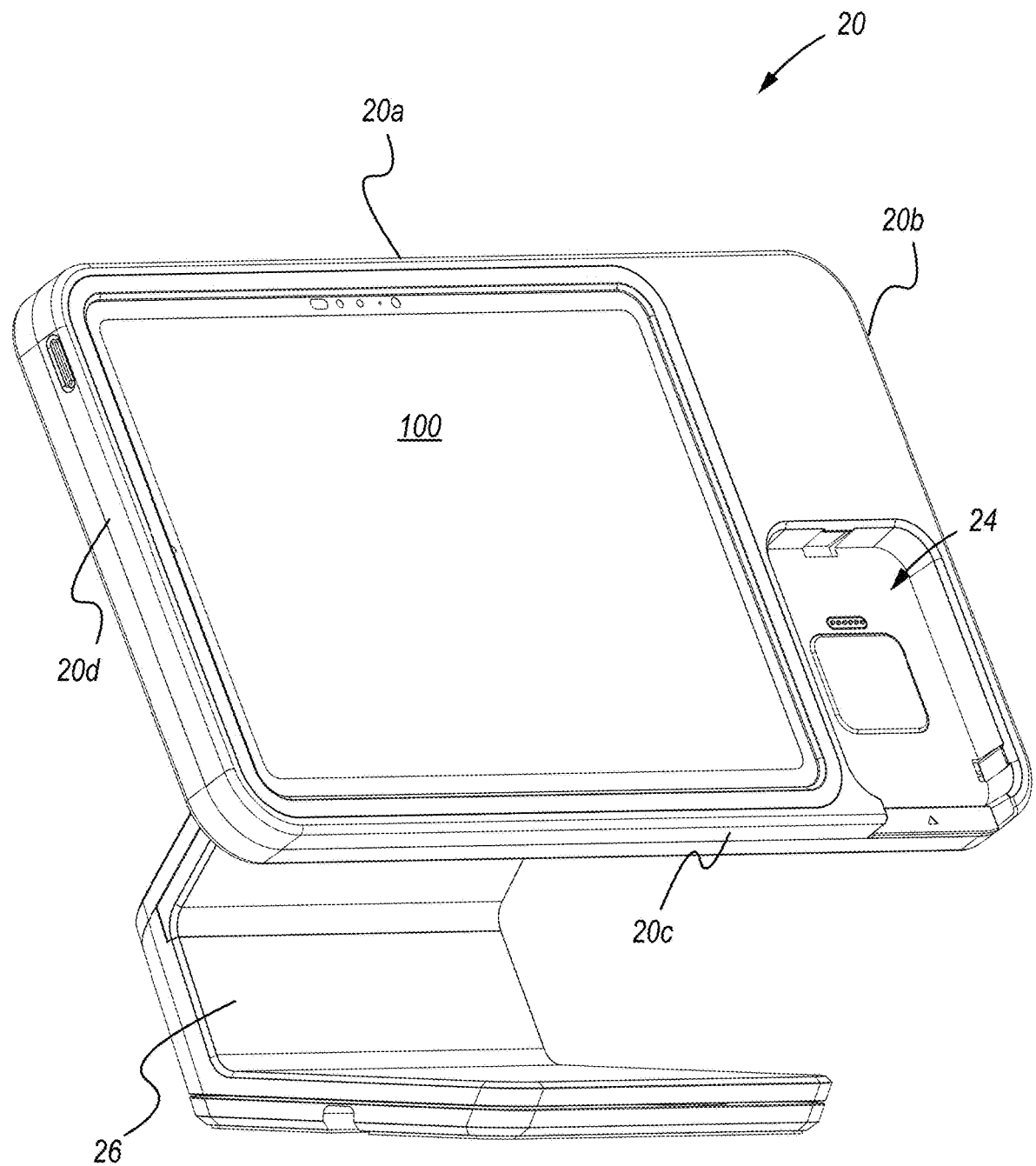
FIG. 15 is a left perspective view of the platform structure coupled with the stand assembly of FIG. 10 coupled with the electronic tablet of FIG. 11.

Turning to FIG. 15, depicted therein is a left perspective view of platform structure 20 including portable electronic device holder assembly 22 coupled with electronic tablet 100.

Figure 16:
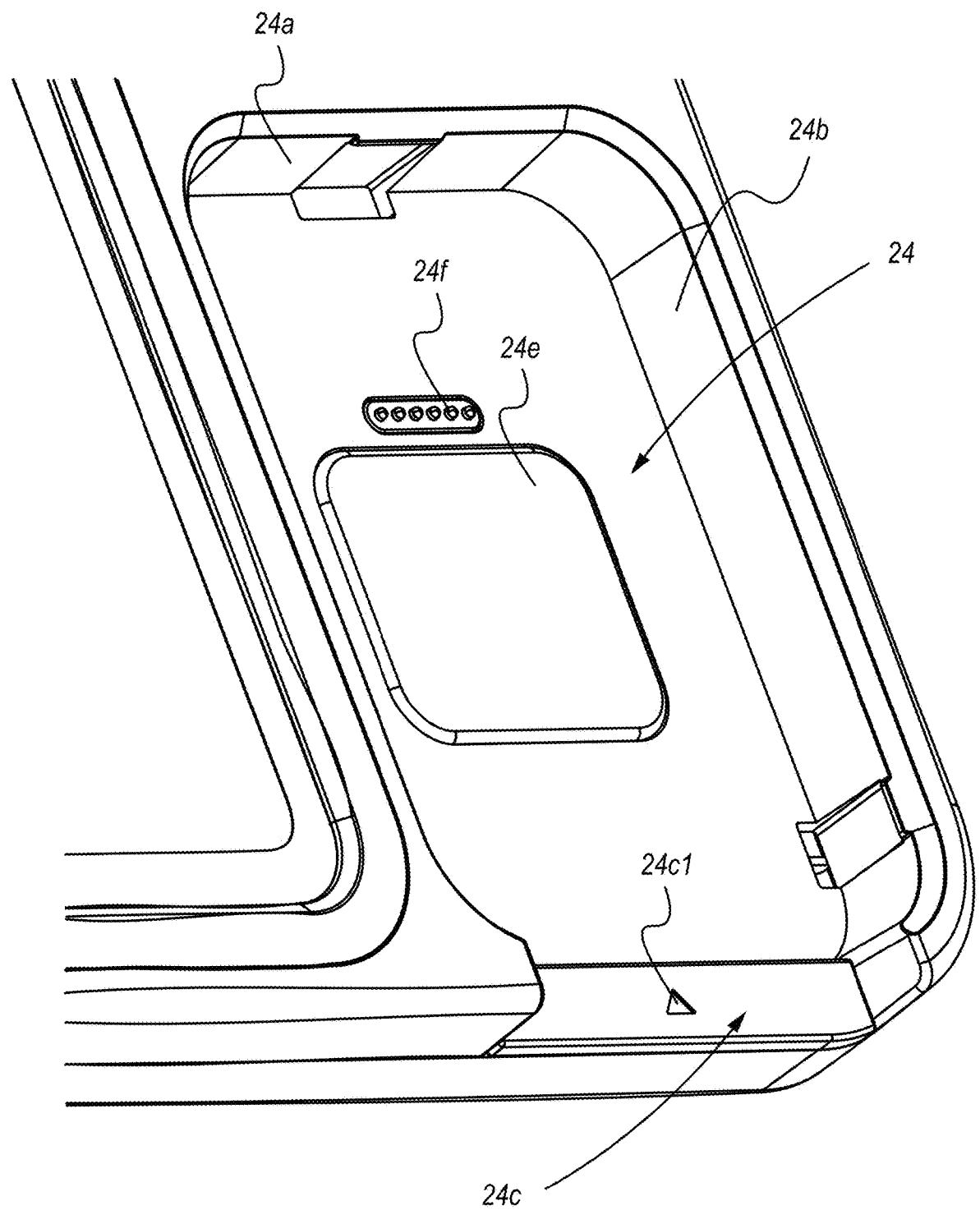
FIG. 16 is an enlarged left perspective view of a portion of the platform structure of FIG. 10.

Turning to FIG. 16, depicted therein is an enlarged left perspective view of a portion of platform structure 20 including payment card reader holder assembly 24.

Figure 17:
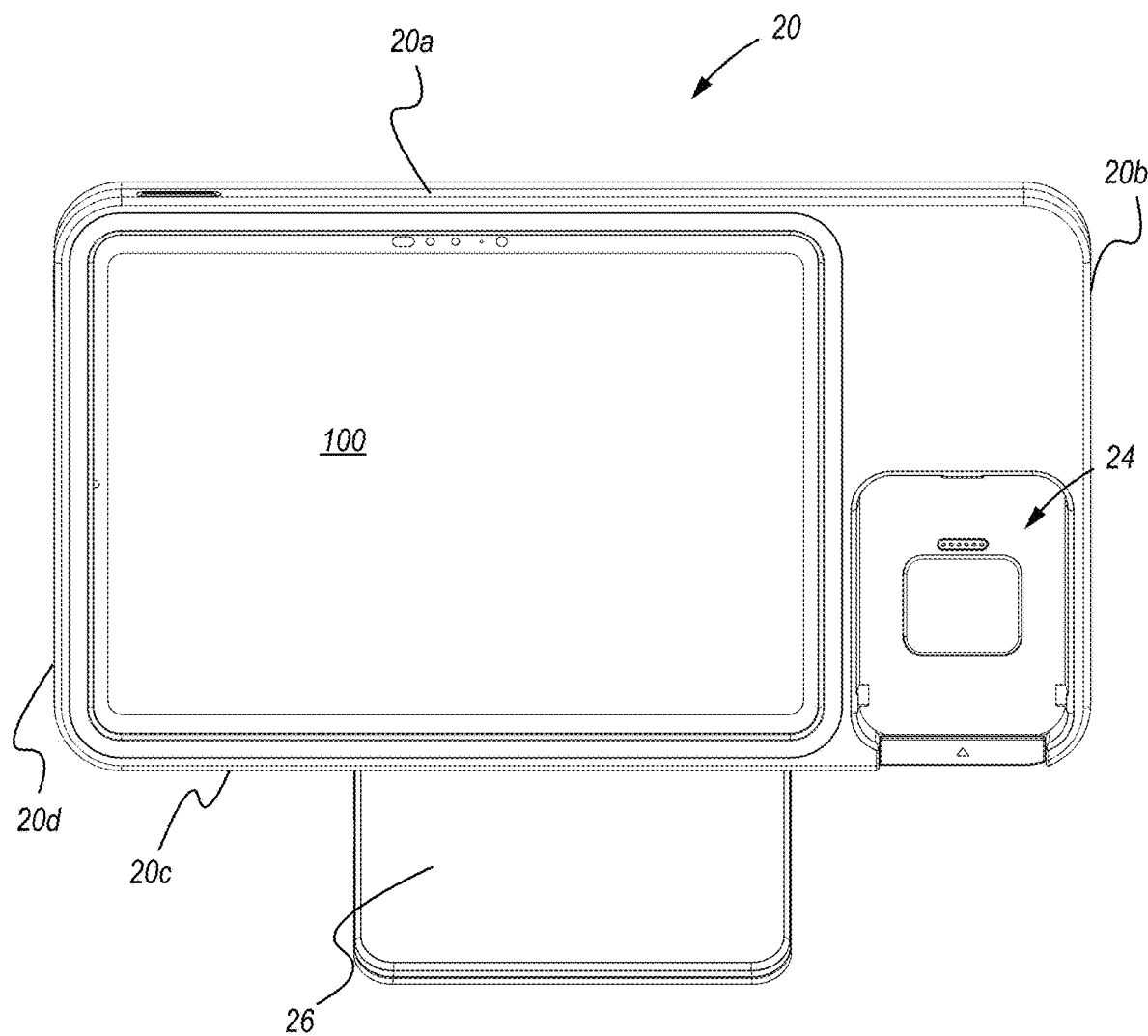
FIG. 17 is a top plan view of the platform structure coupled with the stand assembly of FIG. 10 coupled with the electronic tablet of FIG. 11.

Turning to FIG. 17, depicted therein is a top plan view of platform structure 20 including portable electronic device holder assembly 22 coupled with electronic tablet 100.

Figure 18:
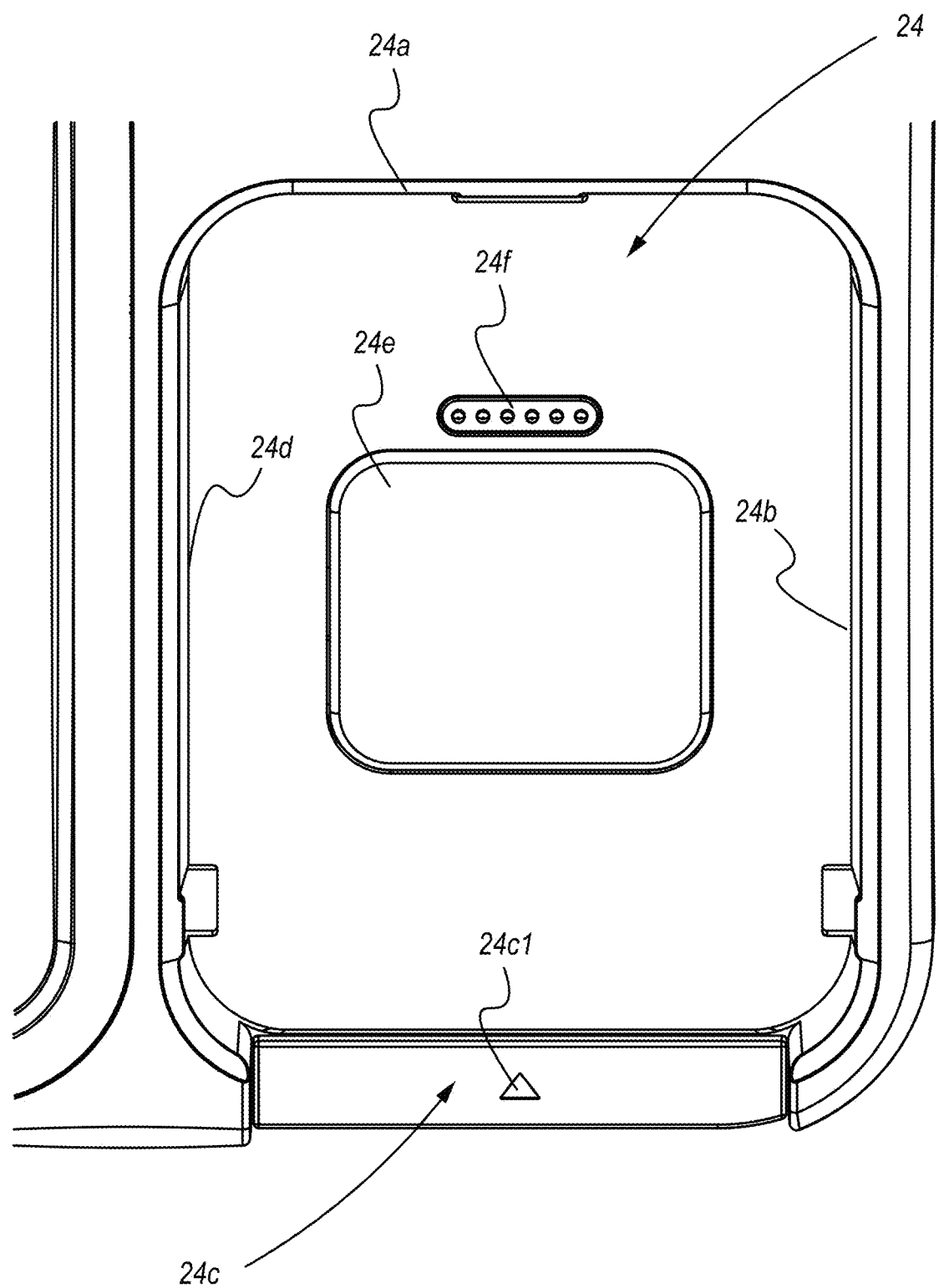
FIG. 18 is an enlarged top plan view of a portion of the platform structure of FIG. 10.

Turning to FIG. 18, depicted therein is an enlarged top plan view of a portion of platform structure 20 including payment card reader holder assembly 24.

Figure 19:
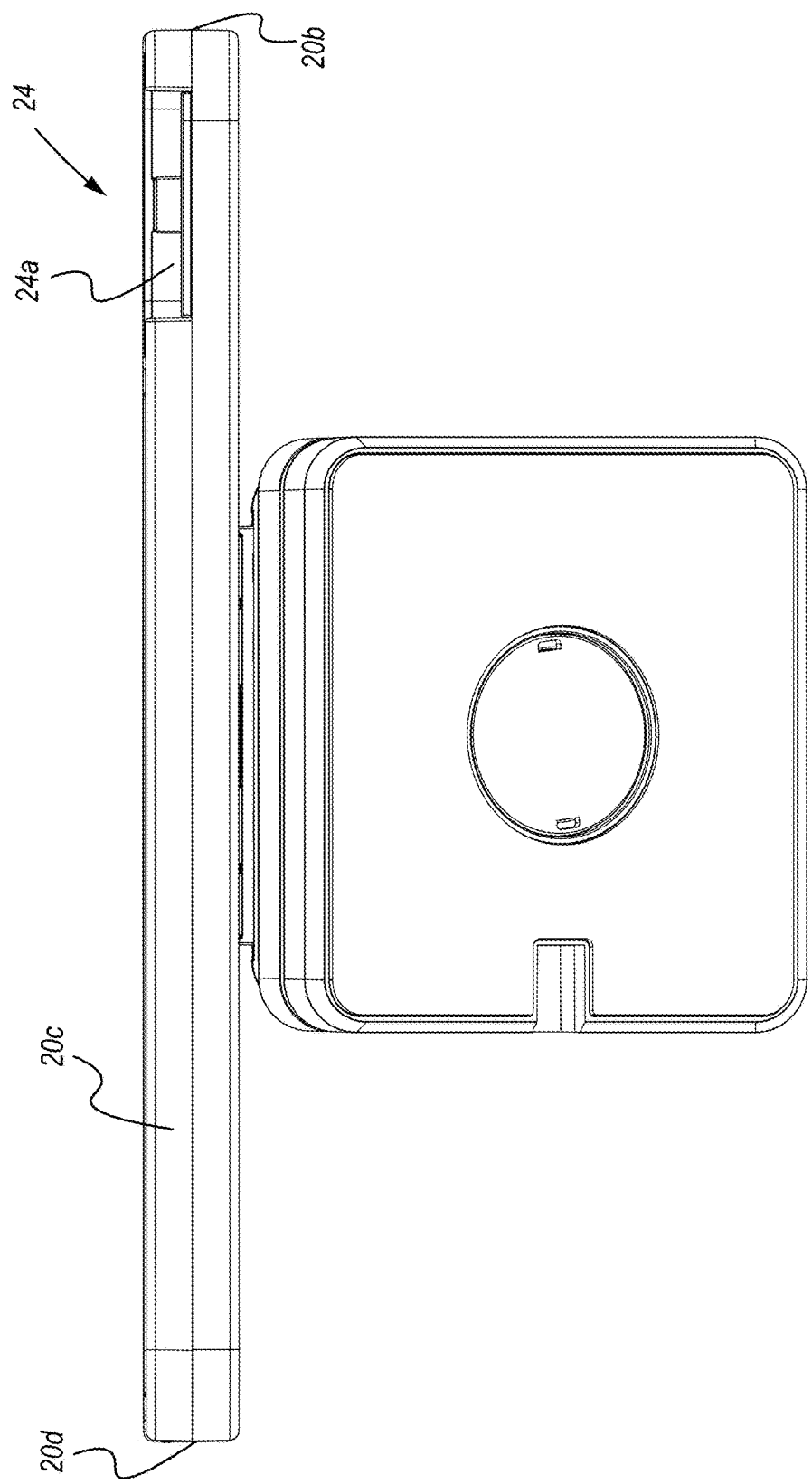
FIG. 19 is a bottom plan view of the platform structure coupled with the stand assembly of FIG. 10.

Turning to FIG. 19, depicted therein is a bottom plan view of platform structure 20 including payment card reader holder assembly 24.

Figure 19A:
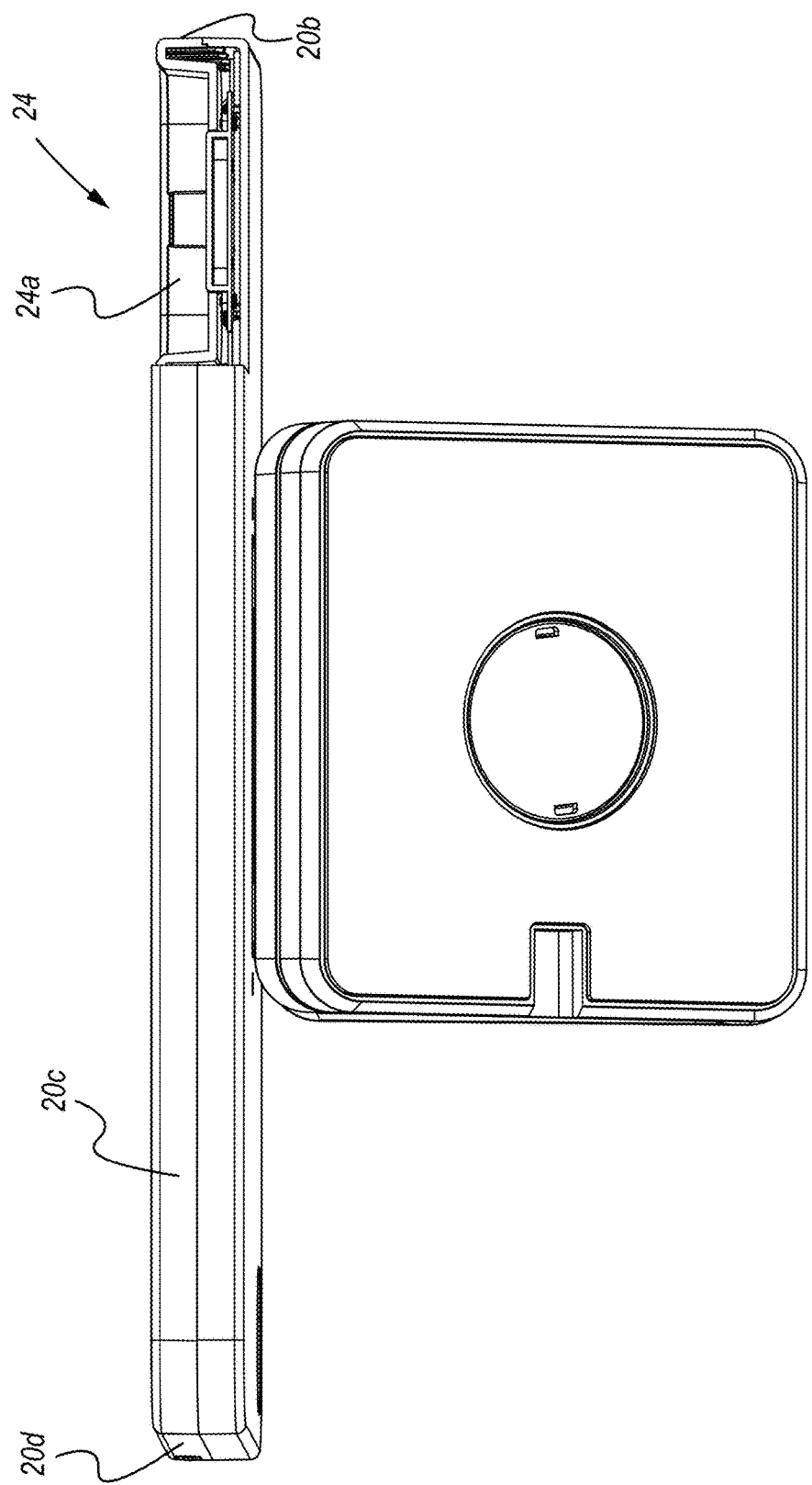
FIG. 19A is a bottom plan view of the platform structure coupled with the stand assembly of FIG. 10 showing a portion of such in cross-section.

Turning to FIG. 19A, depicted therein is a bottom plan view of platform structure 20 showing payment card reader holder assembly 24 in cross-section.

Turning to FIG. 19B, depicted therein is an enlarged bottom plan view of platform structure 20 showing payment card reader holder assembly 24 as the cross-sectional portion of FIG. 19A.

Figure 19C:
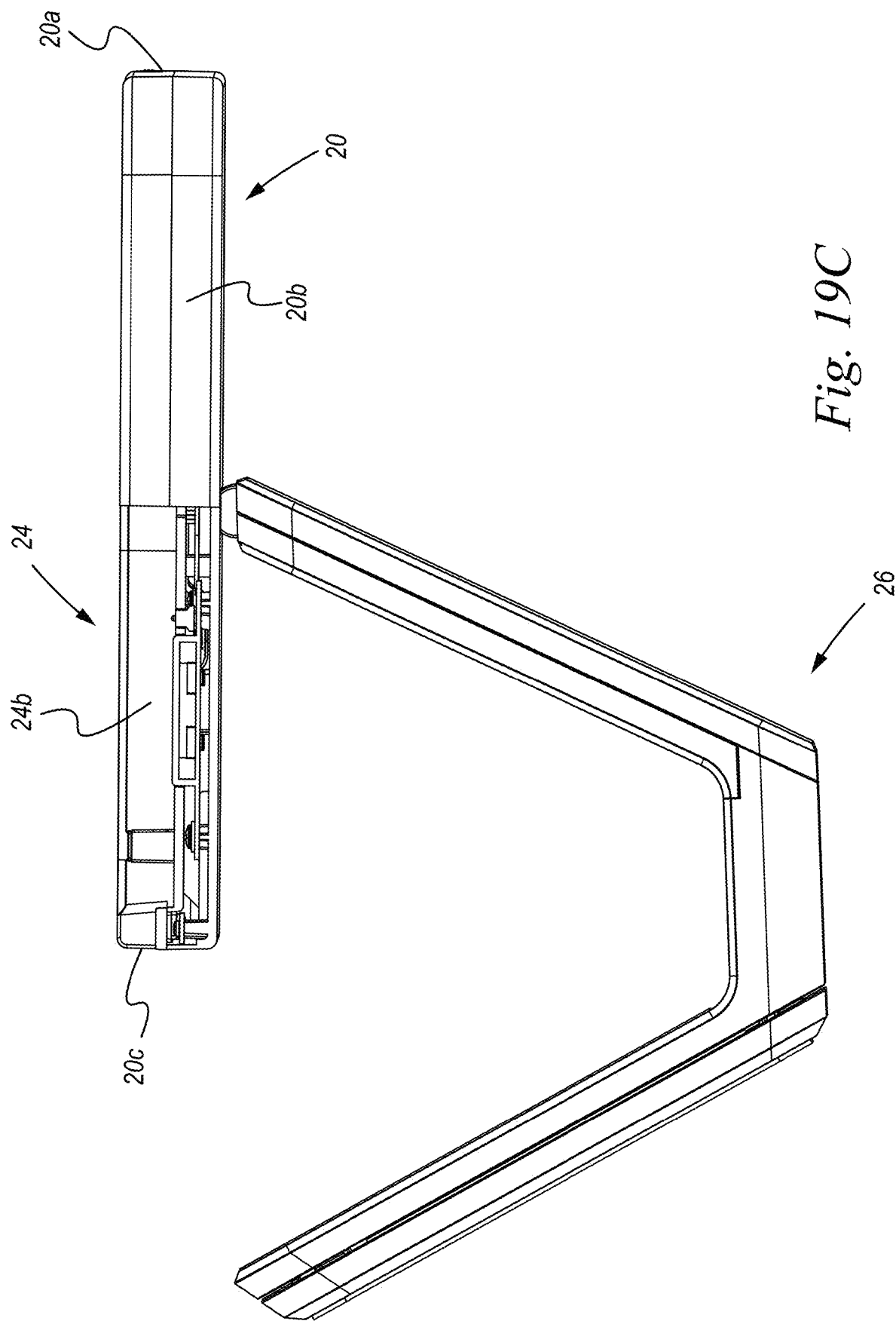
FIG. 19C is a side elevational view of the platform structure coupled with the stand assembly of FIG. 10 showing a portion of such in cross-section.

Turning to FIG. 19C, depicted therein is a side elevational view of platform structure 20 showing the payment card reader holder assembly 24 portion of such in cross-section.

Figure 19D:
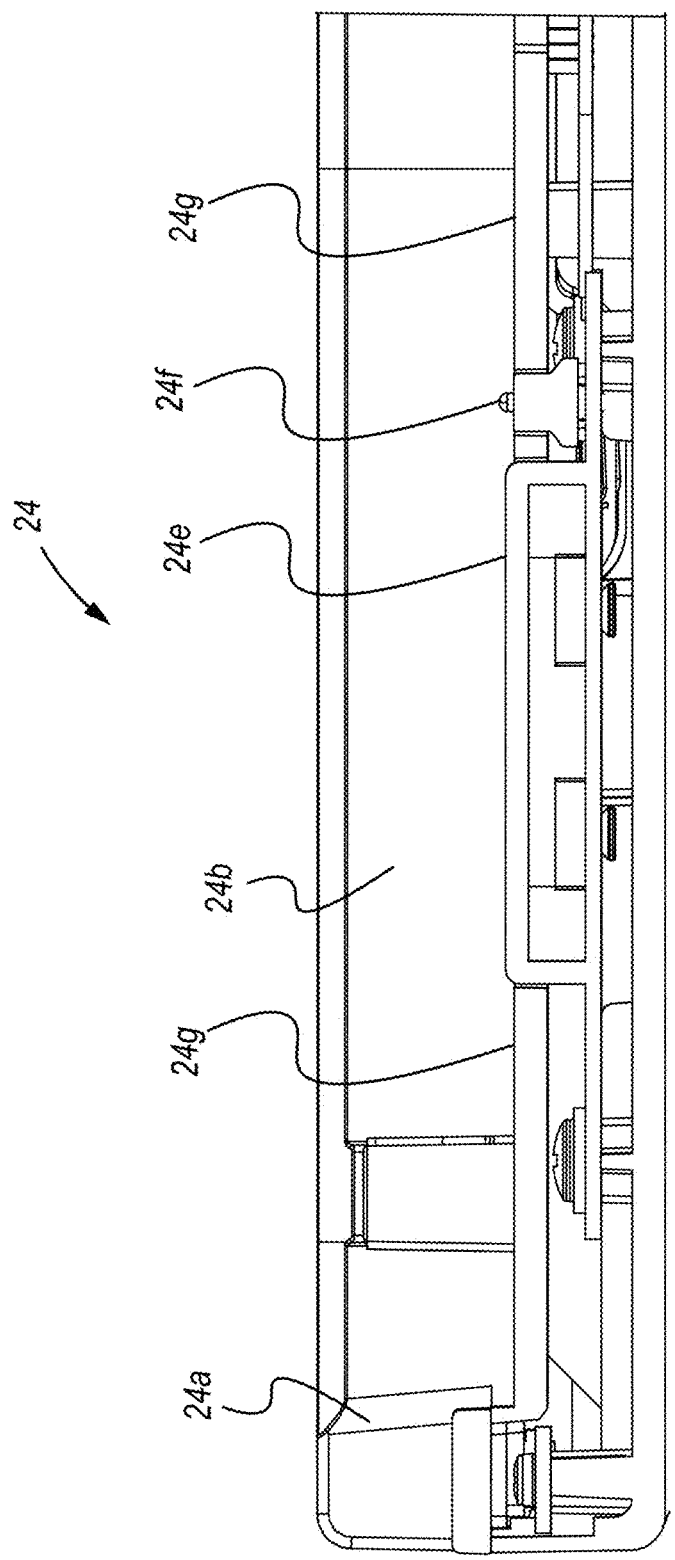
FIG. 19D is an enlarged side elevational view of a portion of the platform structure of FIG. 10 showing the cross-sectional portion of FIG. 19C.

Turning to FIG. 19D, depicted therein is an enlarged side elevational view of platform structure 20 showing payment card reader holder assembly 24 as the cross-sectional portion of FIG. 19C.

Figure 20:
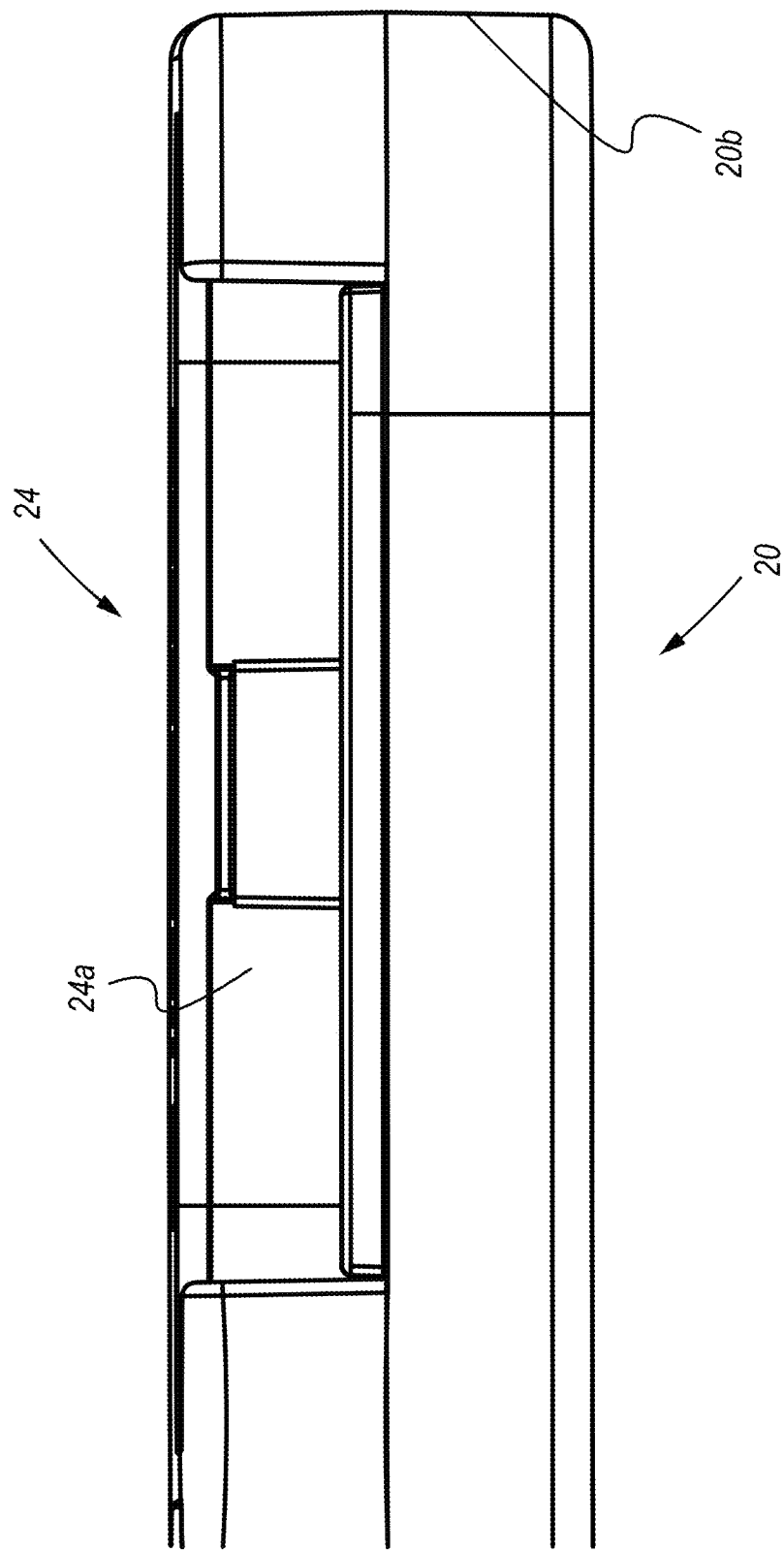
FIG. 20 is an enlarged bottom plan view of a portion of the platform structure of FIG. 10.

Turning to FIG. 20, depicted therein is an enlarged bottom plan view of a portion of platform structure 20 as payment card reader holder assembly 24.

Figure 21:
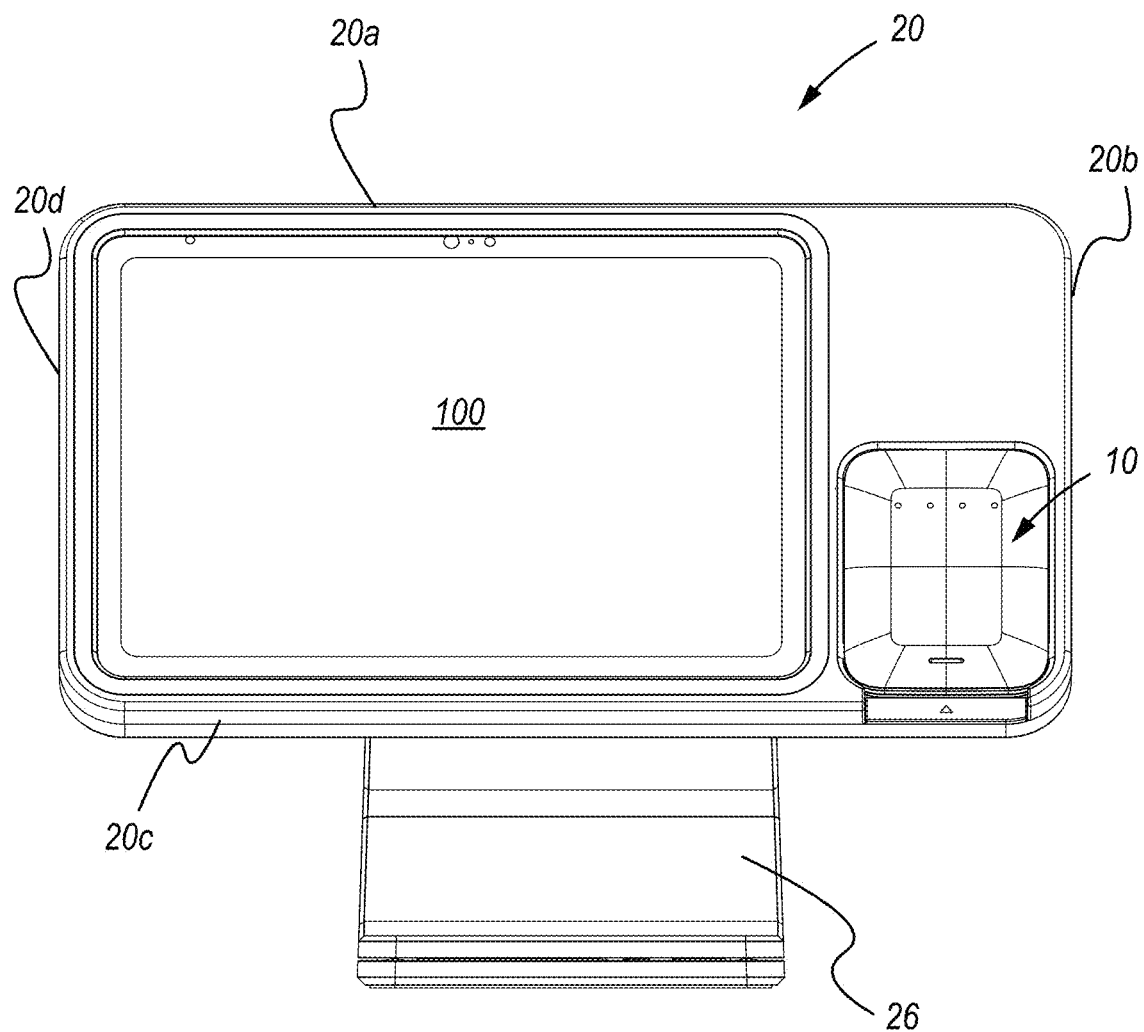
FIG. 21 is a front elevational view of the platform structure coupled with the stand assembly of FIG. 10 coupled with the payment card reader of FIG. 1 and coupled with electronic tablet of FIG. 11.

Turning to FIG. 21, depicted therein is a front elevational view of platform structure 20 including payment card reader holder assembly 24 coupled with payment card reader 10 and portable electronic device holder assembly 22 coupled with electronic tablet 100.

Figure 22:
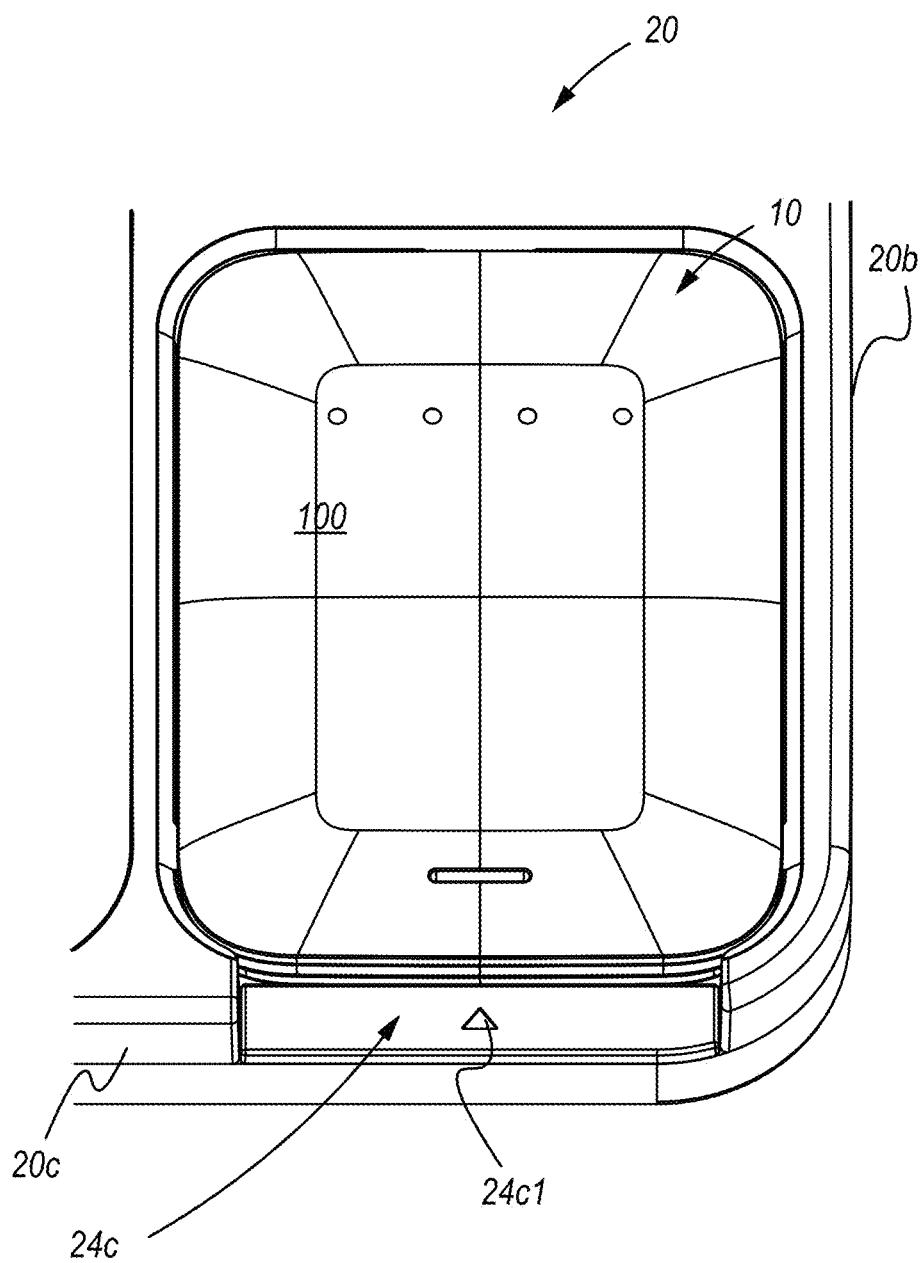
FIG. 22 is an enlarged front elevational view of a portion of the platform structure of FIG. 10 coupled with the payment card reader of FIG. 1.

Turning to FIG. 22, depicted therein is an enlarged front elevational view of a portion of platform structure 20 including payment card reader holder assembly 24 coupled with payment card reader 10.

Figure 23:
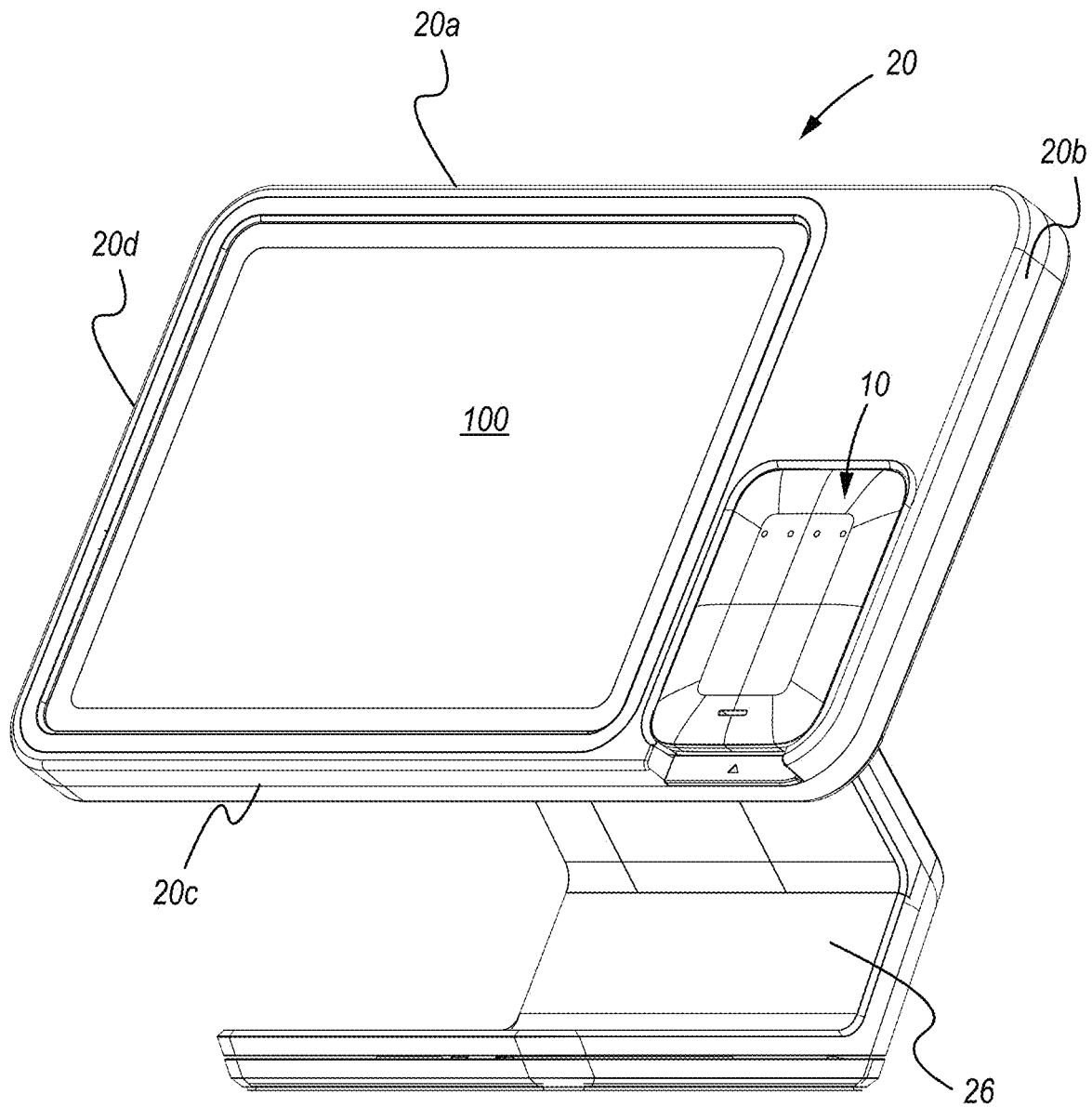
FIG. 23 is a right perspective view of the platform structure coupled with the stand assembly of FIG. 10 coupled with the payment card reader of FIG. 1 and coupled with electronic tablet of FIG. 11.

Turning to FIG. 23, depicted therein is a right perspective view of platform structure 20 including payment card reader holder assembly 24 coupled with payment card reader 10 and portable electronic device holder assembly 22 coupled with electronic tablet 100.

Figure 24:
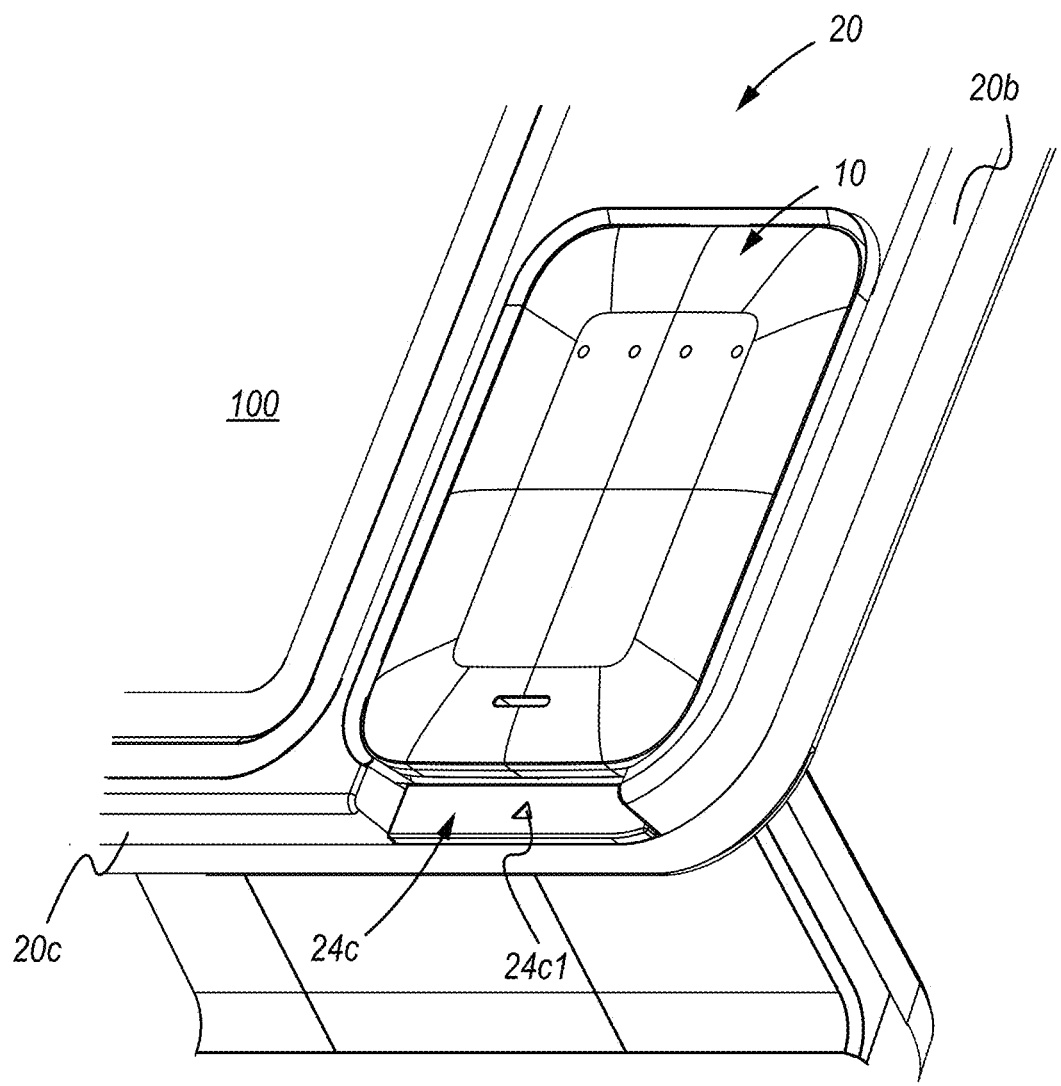
FIG. 24 is an enlarged right perspective view of a portion of the platform structure coupled with the stand assembly of FIG. 10 coupled with the payment card reader of FIG. 1.

Turning to FIG. 24, depicted therein is an enlarged right perspective view of a portion of platform structure 20 including payment card reader holder assembly 24 coupled with payment card reader 10.

Figure 25:
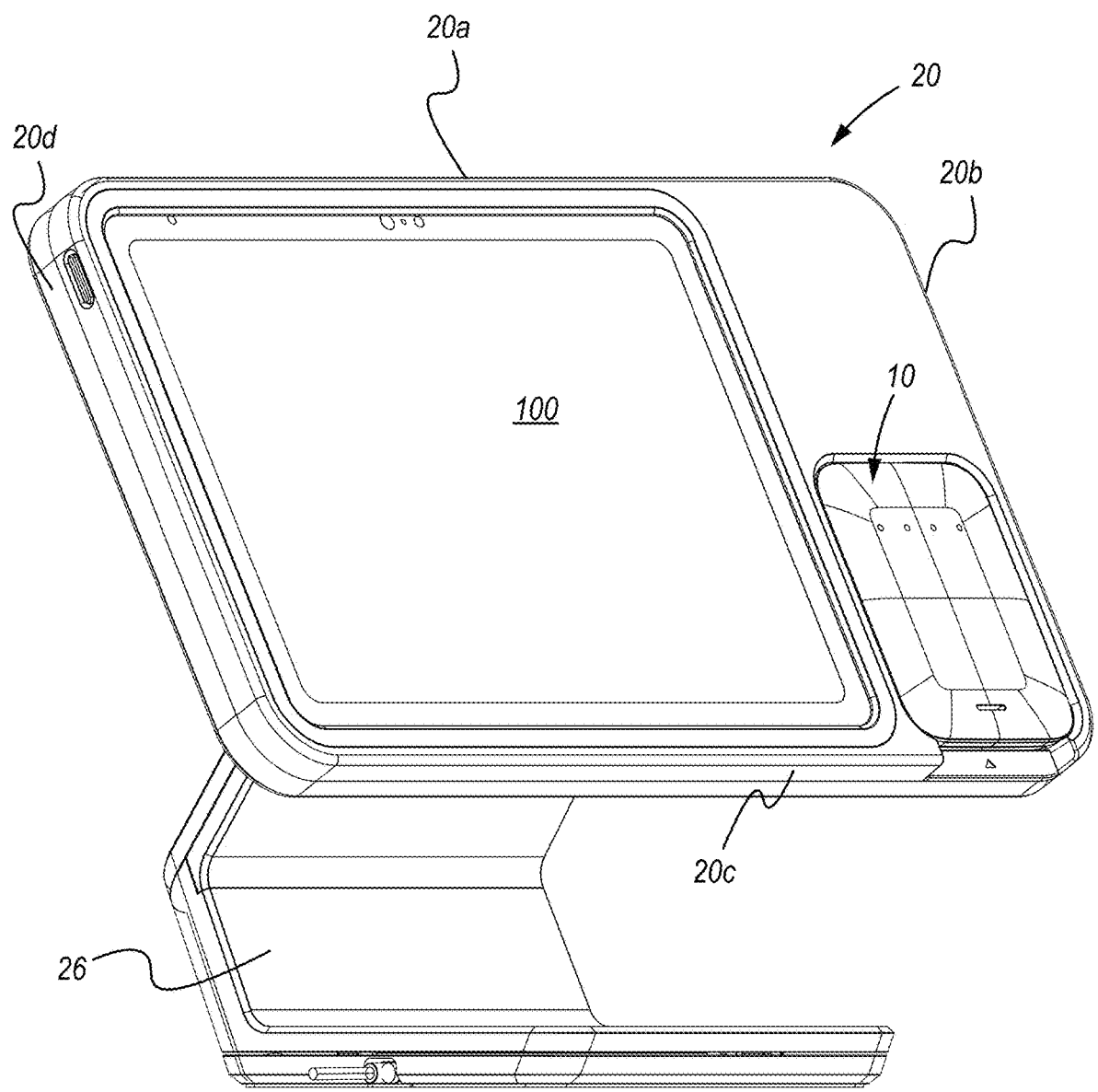
FIG. 25 is a left perspective view of the platform structure coupled with the stand assembly of FIG. 10 coupled with the payment card reader of FIG. 1 and coupled with electronic tablet of FIG. 11.

Turning to FIG. 25, depicted therein is a left perspective view of platform structure 20 including payment card reader holder assembly 24 coupled with payment card reader 10 and portable electronic device holder assembly 22 coupled with electronic tablet 100.

Figure 26:
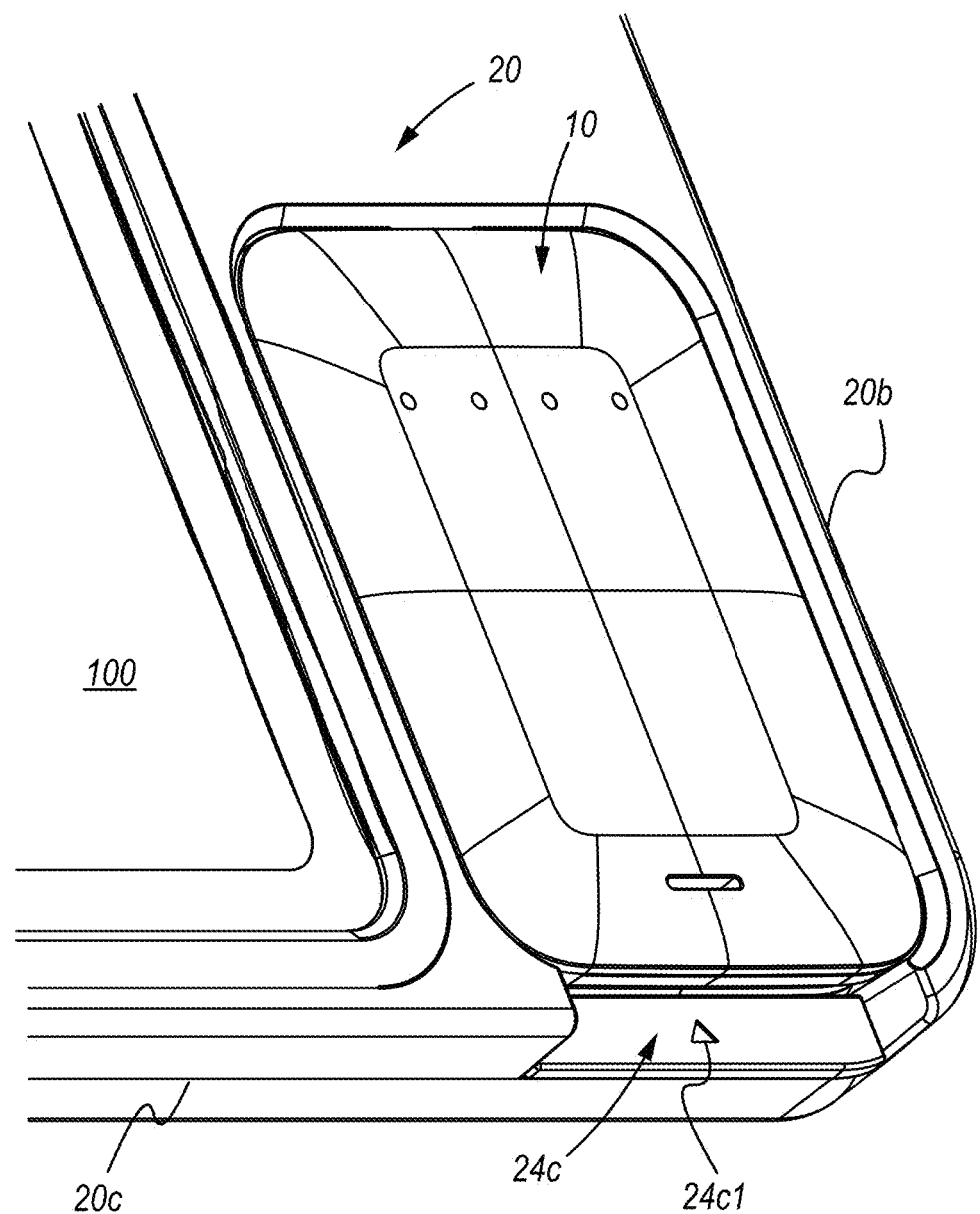
FIG. 26 is an enlarged left perspective view of a portion of the platform structure of FIG. 10 coupled with the payment card reader of FIG. 1.

Turning to FIG. 26, depicted therein is an enlarged left perspective view of a portion of platform structure 20 including payment card reader holder assembly 24 coupled with payment card reader 10.

Figure 27:
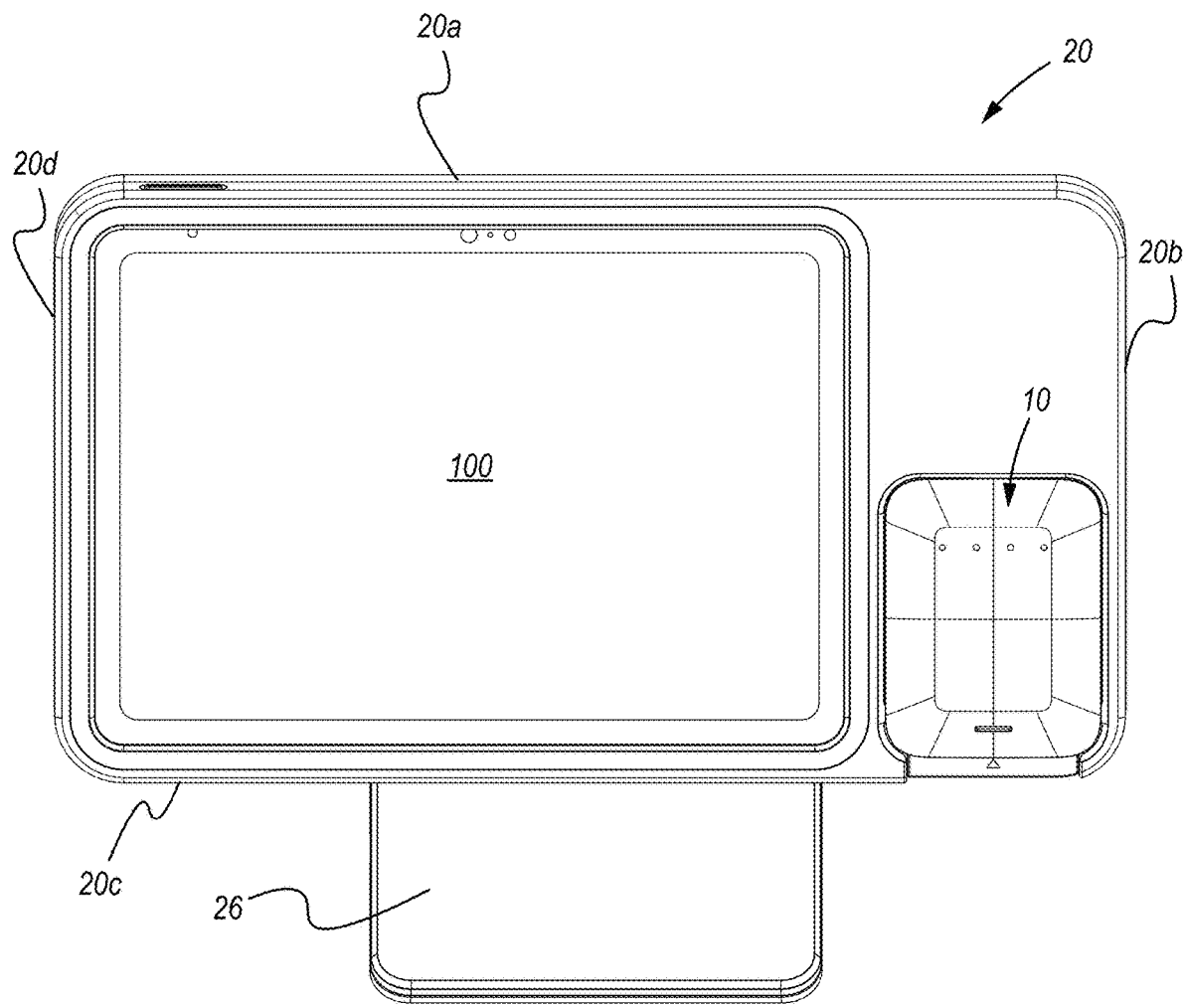
FIG. 27 is a top plan view of the platform structure coupled with the stand assembly of FIG. 10 coupled with the payment card reader of FIG. 1 and coupled with electronic tablet of FIG. 11.

Turning to FIG. 27, depicted therein is a top plan view of platform structure 20 including payment card reader holder assembly 24 coupled with payment card reader 10 and portable electronic device holder assembly 22 coupled with electronic tablet 100.

Figure 28:
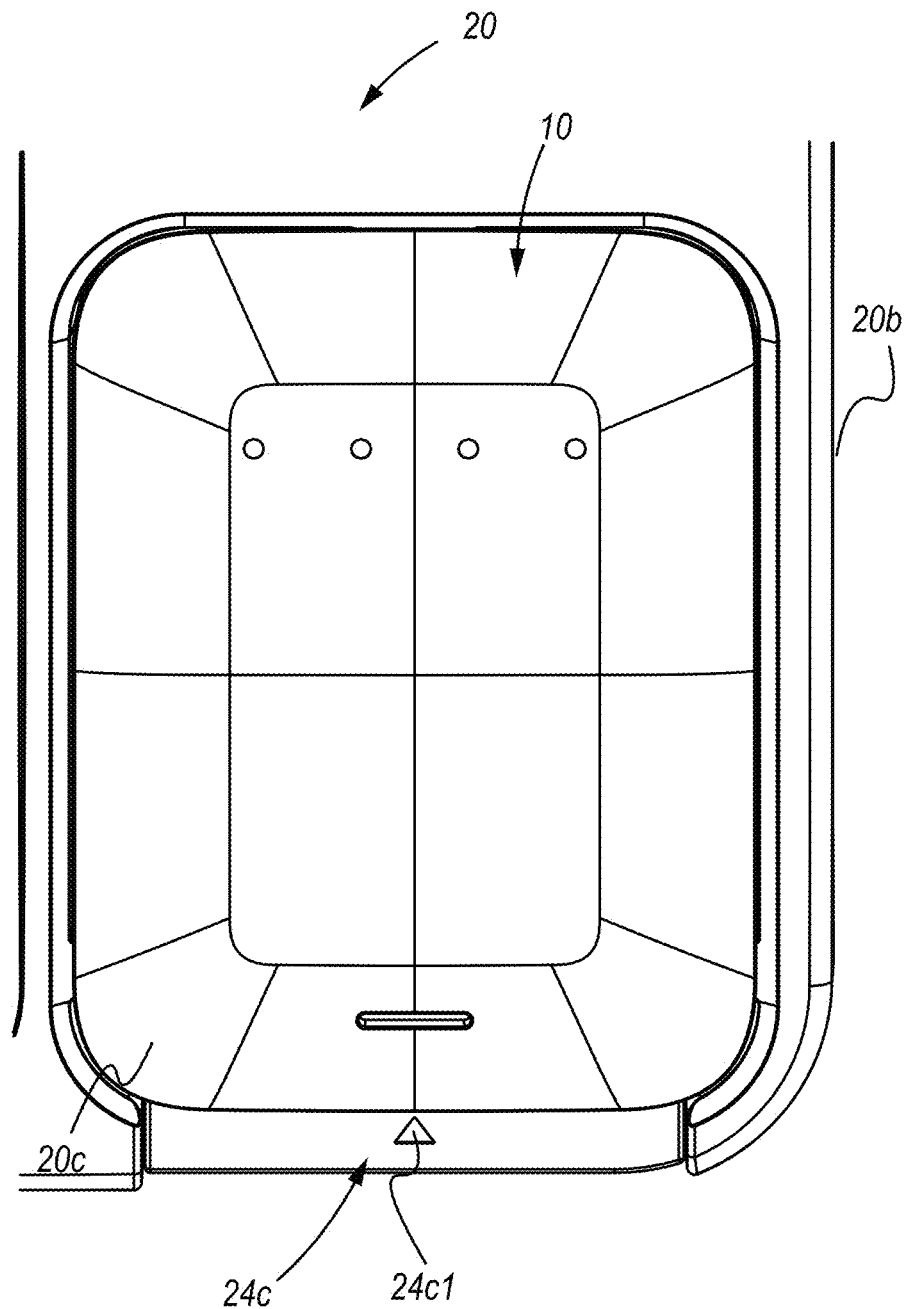
FIG. 28 is an enlarged top plan view of a portion of the platform of FIG. 10 coupled with the payment card reader of FIG. 1.

Turning to FIG. 28, depicted therein is an enlarged top plan view of a portion of platform structure 20 including payment card reader holder assembly 24 coupled with payment card reader 10.

Figure 29:
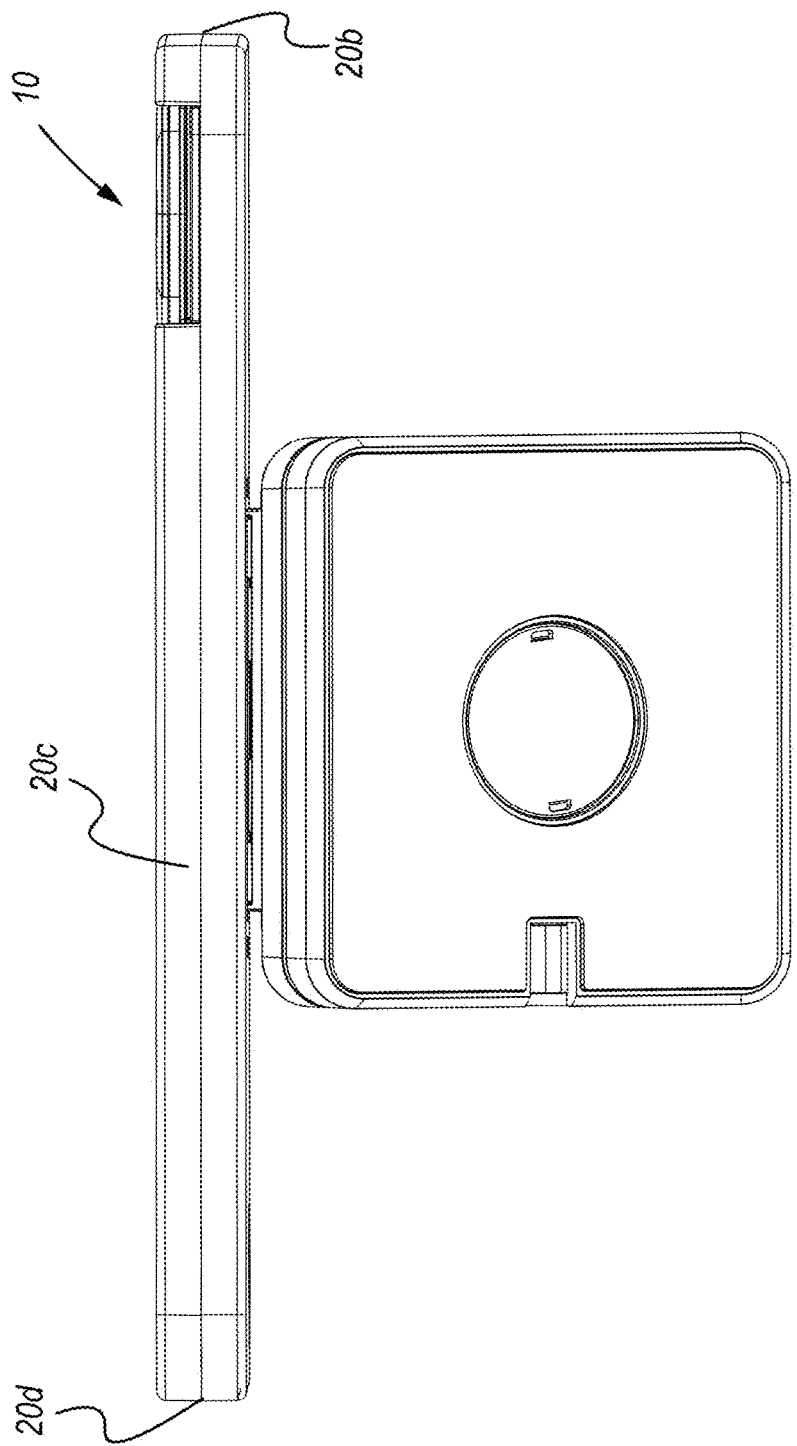
FIG. 29 is a bottom plan view of the platform structure coupled with the stand assembly of FIG. 10 coupled with the payment card reader of FIG. 1.

Turning to FIG. 29, depicted therein is a bottom plan view of platform structure 20 including payment card reader holder assembly 24 coupled with payment card reader 10.

Turning to FIG. 30, depicted therein is an enlarged bottom plan view of platform structure 20 including payment card reader holder assembly 24 coupled with payment card reader 10.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A device stand system for a portable electronic device and a payment card reader, the device stand system comprising:
   (I) a platform structure including
      (A) a first side,
      (B) a second side extending perpendicularly with respect to the first side,
      (C) a third side extending perpendicularly with respect to the second side,
      (D) a fourth side extending perpendicularly with respect to the first side,
      (E) a portable electronic device holder assembly couplable with the portable electronic device, and
      (F) a payment card reader holder assembly couplable with the payment card reader; and
   (II) a stand assembly coupled with the platform structure, wherein the portable electronic device holder assembly includes:
      a base,
      a first side wall extending perpendicularly with respect to the base, extending parallel with the first side of the platform structure, and positioned closer to the first side of the platform structure than to the third side of the platform structure, a second side wall extending perpendicularly with respect to the base, extending parallel with the second side of the platform structure, and positioned closer to the second side of the platform structure than the fourth side of the platform structure, a third side wall extending perpendicularly with respect to the base, extending parallel with the third side of the platform structure, and positioned closer to the third side of the platform structure than to the first side of the platform structure, and a fourth side wall extending perpendicularly with respect to the base, extending parallel with the fourth side of the platform structure, and positioned closer to the fourth side of the platform structure than to the second side of the platform structure, wherein the second side wall perpendicularly extends with respect to the first side wall, wherein the third side wall parallelly extends with respect to the first side wall, wherein the fourth side wall perpendicularly extends with respect to the first side wall, and wherein the device holder assembly is sized and shaped to couple with the portable electronic device.

2. The device stand system of claim 1,
wherein the payment card reader holder assembly includes:
a base,
a first side wall extending perpendicularly with respect to the base,
a second side wall extending perpendicularly with respect to the base, and
a third side wall extending perpendicularly with respect to the base,
wherein the second side wall perpendicularly extends with respect to the first side wall,
wherein the third side wall perpendicularly extends with respect to the first side wall, and
wherein the payment card reader holder assembly is sized and shaped to couple with the payment card reader.

3. The device stand system of claim 2,
wherein the third side wall of the payment card reader holder assembly extends parallel with the second side wall of the portable electronic device holder, and
wherein the third side wall of the payment card reader holder assembly is positioned closer to the second side wall of the portable electronic device holder than the fourth side wall of the portable electronic device holder.

4. The device stand system of claim 2,
wherein the payment card holder assembly includes an access opening positioned opposite from the first side wall across the base of the payment card holder assembly.

5. The device stand system of claim 4,
wherein the third side of the platform structure includes the access opening.

6. The device stand system of claim 4,
wherein the access opening of the payment card holder assembly includes has an electrically activated engagement indicator.

7. The device stand system of claim 2,
wherein the payment card holder assembly includes at least one magnet to magnetically couple with a first portion of the payment card reader, and
and an electrical interface to electrically couple with a second portion of the payment card reader.

8. A device stand system for a portable electronic device and a payment card reader, the device stand system comprising:
(I) a platform structure including
(A) a first side,
(B) a second side extending perpendicularly with respect to the first side,
(C) a third side extending perpendicularly with respect to the second side,
(D) a fourth side extending perpendicularly with respect to the first side,
(E) a portable electronic device holder assembly couplable with the portable electronic device, and
(F) a payment card reader holder assembly couplable with the payment card reader; and
(II) a stand assembly coupled with the platform structure,
wherein the stand assembly includes a stand lower member having a lower portion and an upper portion extending from the lower portion at a first angle,
wherein the stand assembly includes a includes a stand upper front member coupled with the upper portion of the stand lower member and extending from the upper portion of the stand lower member at a second angle, and
wherein the sum of the first angle and the second angle is greater than ninety degrees.

9. The device stand system of claim 8
wherein the first angle and the second angle of the stand assembly are oblique angles.

10. A device stand system for a portable electronic device and a payment card reader, the device stand system comprising:
(I) a platform structure including
(A) a first side,
(B) a second side extending perpendicularly with respect to the first side,
(C) a third side extending perpendicularly with respect to the second side,
(D) a fourth side extending perpendicularly with respect to the first side,
(E) a portable electronic device holder assembly couplable with the portable electronic device, and
(F) a payment card reader holder assembly couplable with the payment card reader,
wherein the portable electronic device holder assembly includes:
a base,
a first side wall extending perpendicularly with respect to the base, extending parallel with the first side of the platform structure, and positioned closer to the first side of the platform structure than to the third side of the platform structure,
a second side wall extending perpendicularly with respect to the base, extending parallel with the second side of the platform structure, and positioned closer to the second side of the platform structure than the fourth side of the platform structure,
a third side wall extending perpendicularly with respect to the base, extending parallel with the third side of the platform structure, and positioned closer to the third side of the platform structure than to the first side of the platform structure, and a fourth side wall extending perpendicularly with respect to the base, extending parallel with the fourth side of the platform structure, and positioned closer to the fourth side of the platform structure than to the second side of the platform structure, wherein the second side wall perpendicularly extends with respect to the first side wall, wherein the third side wall parallelly extends with respect to the first side wall, wherein the fourth side wall perpendicularly extends with respect to the first side wall, and wherein the device holder assembly is sized and shaped to couple with the portable electronic device, wherein the payment card reader holder assembly includes:

a base, a first side wall extending perpendicularly with respect to the base, a second side wall extending perpendicularly with respect to the base, and a third side wall extending perpendicularly with respect to the base, wherein the second side wall perpendicularly extends with respect to the first side wall, wherein the third side wall perpendicularly extends with respect to the first side wall, and wherein the payment card reader holder assembly is sized and shaped to couple with the payment card reader.

11. The device stand system of claim 10, wherein the third side wall of the payment card reader holder assembly extends parallel with the second side wall of the portable electronic device holder, and wherein the third side wall of the payment card reader holder assembly is positioned closer to the second side wall of the portable electronic device holder than the fourth side wall of the portable electronic device holder.

12. The device stand system of claim 10, wherein the payment card holder assembly includes an access opening positioned opposite from the first side wall across the base of the payment card holder assembly.

13. The device stand system of claim 12, wherein the third side of the platform structure includes the access opening.

14. A device stand system for a portable electronic device and a payment card reader, the device stand system comprising:

(I) a platform structure couplable with the portable electronic device, the platform structure including
(A) a first side,
(B) a second side extending perpendicularly with respect to the first side,
(C) a third side extending perpendicularly with respect to the second side,
(D) a fourth side extending perpendicularly with respect to the first side, and
(E) a payment card reader holder assembly couplable with the payment card reader; and (II) a stand assembly coupled with the platform structure, wherein the payment card reader holder assembly includes:

a base, a first side wall extending perpendicularly with respect to the base, a second side wall extending perpendicularly with respect to the base, and a third side wall extending perpendicularly with respect to the base, wherein the second side wall perpendicularly extends with respect to the first side wall, wherein the third side wall perpendicularly extends with respect to the first side wall, and wherein the payment card reader holder assembly is sized and shaped to couple with the payment card reader.

15. The device stand system of claim 14, wherein the second side wall of the payment card reader holder assembly extends parallel with the second side of the platform structure, and wherein the second side wall of the payment card reader holder assembly is positioned closer to the second side of the platform structure than the fourth side of the platform structure.

16. The device stand system of claim 14, wherein the payment card holder assembly includes an access opening positioned opposite from the first side wall across the base of the payment card holder assembly, and wherein the third side of the platform structure includes the access opening.

\* \* \* \* \*